US007877355B2

(12) United States Patent
Borgsmidt et al.

(10) Patent No.: US 7,877,355 B2
(45) Date of Patent: Jan. 25, 2011

(54) JOB SCHEDULING FOR AUTOMATIC MOVEMENT OF MULTIDIMENSIONAL DATA BETWEEN LIVE DATACUBES

(75) Inventors: Rasmus Borgsmidt, Luxembourg (LU); David S. Bowen, York (GB)

(73) Assignee: International Business Machines Corporation, Armonk, NY (US)

( * ) Notice: Subject to any disclaimer, the term of this patent is extended or adjusted under 35 U.S.C. 154(b) by 326 days.

(21) Appl. No.: 11/900,895

(22) Filed: Sep. 13, 2007

(65) Prior Publication Data
US 2008/0077621 A1    Mar. 27, 2008

Related U.S. Application Data

(63) Continuation-in-part of application No. 11/103,902, filed on Apr. 12, 2005.

(60) Provisional application No. 60/910,077, filed on Apr. 4, 2007.

(51) Int. Cl.
    *G06F 7/00*      (2006.01)
    *G06F 17/00*      (2006.01)

(52) U.S. Cl. .................... 707/616; 707/625; 707/637; 707/638

(58) Field of Classification Search ............ 707/104.1, 707/999.104, 610, 616, 624, 625, 637, 638
See application file for complete search history.

(56) References Cited

U.S. PATENT DOCUMENTS

| | | | |
|---|---|---|---|
| 4,878,175 A | 10/1989 | Norden-Paul et al. | |
| 5,247,611 A | 9/1993 | Norden-Paul et al. | |
| 5,325,478 A | 6/1994 | Shelton et al. | |
| 5,546,580 A | 8/1996 | Seliger et al. | |

(Continued)

FOREIGN PATENT DOCUMENTS

EP      0 501 180 A2     9/1992

(Continued)

OTHER PUBLICATIONS

Sanjay Goil and Alok Choudhary, "An Infrastructure for Scalable Parallel Multidimensional Analysis," *Scientific and Statistical Database Management, Eleventh International Conference*, IEEE Comput. Soc, US, Jul. 28, 1999 (pp. 102-111).

(Continued)

*Primary Examiner*—John E Breene
*Assistant Examiner*—Mark E Hershley
(74) *Attorney, Agent, or Firm*—Shumaker & Sieffert, P.A.

(57) ABSTRACT

Techniques are described for sharing multidimensional data between software systems, such as enterprise software systems. Specifically, the techniques provide mechanisms for defining inter-application "links" for automatically moving data among different databases associated with the enterprise software systems. For example, a system may include a first database storing multidimensional data for a first software application, and a second database storing multidimensional data for a second software application. The system further includes an interface by which an administrator defines a link that specifies a source area of the first database and a target area of the second database. A link control module automatically moves multidimensional data from the source area to the target area in accordance with the link. The link control module may automatically move the multidimensional data directly between live portions of the respective databases.

29 Claims, 20 Drawing Sheets

U.S. PATENT DOCUMENTS

| | | | |
|---|---|---|---|
| 5,546,680 A | 8/1996 | Barma et al. | |
| 5,590,259 A | 12/1996 | Anderson et al. | |
| 5,701,423 A | 12/1997 | Crozier | |
| 5,899,998 A | 5/1999 | McGauley et al. | |
| 6,167,405 A | 12/2000 | Rosensteel, Jr. et al. | |
| 6,496,913 B1* | 12/2002 | Taugher et al. | 711/170 |
| 6,546,095 B1 | 4/2003 | Iverson et al. | |
| 7,043,497 B1 | 5/2006 | Carty et al. | |
| 7,082,427 B1 | 7/2006 | Seibel et al. | |
| 7,191,183 B1* | 3/2007 | Goldstein | 707/101 |
| 7,197,502 B2 | 3/2007 | Feinsmith | |
| 7,233,952 B1 | 6/2007 | Chen | |
| 7,266,540 B2* | 9/2007 | Chung et al. | 707/1 |
| 2004/0162836 A1 | 8/2004 | Aronoff et al. | |
| 2005/0278458 A1* | 12/2005 | Berger et al. | 709/248 |
| 2006/0022048 A1* | 2/2006 | Johnson | 235/462.1 |
| 2006/0112153 A1 | 5/2006 | Bowen | |
| 2006/0112390 A1* | 5/2006 | Hamaoka | 718/102 |
| 2006/0230025 A1* | 10/2006 | Baelen | 707/3 |
| 2007/0027904 A1* | 2/2007 | Chow et al. | 707/102 |
| 2008/0046481 A1* | 2/2008 | Gould et al. | 707/203 |
| 2008/0249761 A1 | 10/2008 | Easterly | |
| 2008/0301155 A1* | 12/2008 | Borgsmidt | 707/100 |

FOREIGN PATENT DOCUMENTS

| | | |
|---|---|---|
| WO | WO 84/00426 | 2/1984 |
| WO | WO 00/42530 | 7/2000 |

OTHER PUBLICATIONS

Joe Guerra, "Using Microsoft SQL Server Data Transformation Services with IBM Databases," dated Nov. 2002; Internet Article retrieved from URL:http://www.microsoft.com/sql/evaluation/compare/ibm/UsingMSSS-DTSwIBM-DBs.pdf (retrieved on Jul. 27, 2006) pp. 1-19.

International Search Report and Written Opinion from corresponding PCT Application Serial No. PCT/US2006/011993, mailed Aug. 14, 2006 (11 pages).

U.S. Appl. No. 11/950,257, filed Dec. 4, 2007, entitled "Data Entry Commentary and Sheet Reconstruction for Multidimensional Enterprise System."

U.S. Appl. No. 11/954,415, filed Dec. 12, 2007, entitled "Automatically Moving Annotations Associated With Multidimensional Data Between Live Datacubes," 49 pages.

International Preliminary Report on Patentability from corresponding PCT Application Serial No. PCT/US2006/011993 dated Oct. 25, 2007 (7 pages).

European Office Action from corresponding European Application Serial No. 06 740 237.0-1225 dated Jan. 28, 2010 (6 pages).

Office Action from U.S. Appl. No. 11/103,902 mailed Mar. 26, 2009 (15 pages).

Pre-Appeal Brief Request for Review from U.S. Appl. No. 11/103,902, filed Jun. 25, 2009 (5 pages).

* cited by examiner

FIG. 13

Administration Link - Element

Description:
Move Cost Drivers from Health Insurance Planning to Departmental P/L Planning (ututorial3v73)

Pick the source and target applications:

Source application:
Health Insurance Planning

Target application:
tutorial3v73

From application state:
Production

To application state:
○ Development
● Production

Source cube:
Underwriting Margin

Target cube:
Expenses

Map source to target dimenions:

Source dimensions:
elist

Target dimensions:
Versions

Months — Months
Expenses — Expenses
elist — elist
Manual

4 Months
1 Underwriting Margin Calc
2 Customers

[Map] [Map All]
[Edit] [Clear]
[Clear All]

[Help] [Cancel] [< Back] [Next >] [Finish]

170, 172, 173, 174

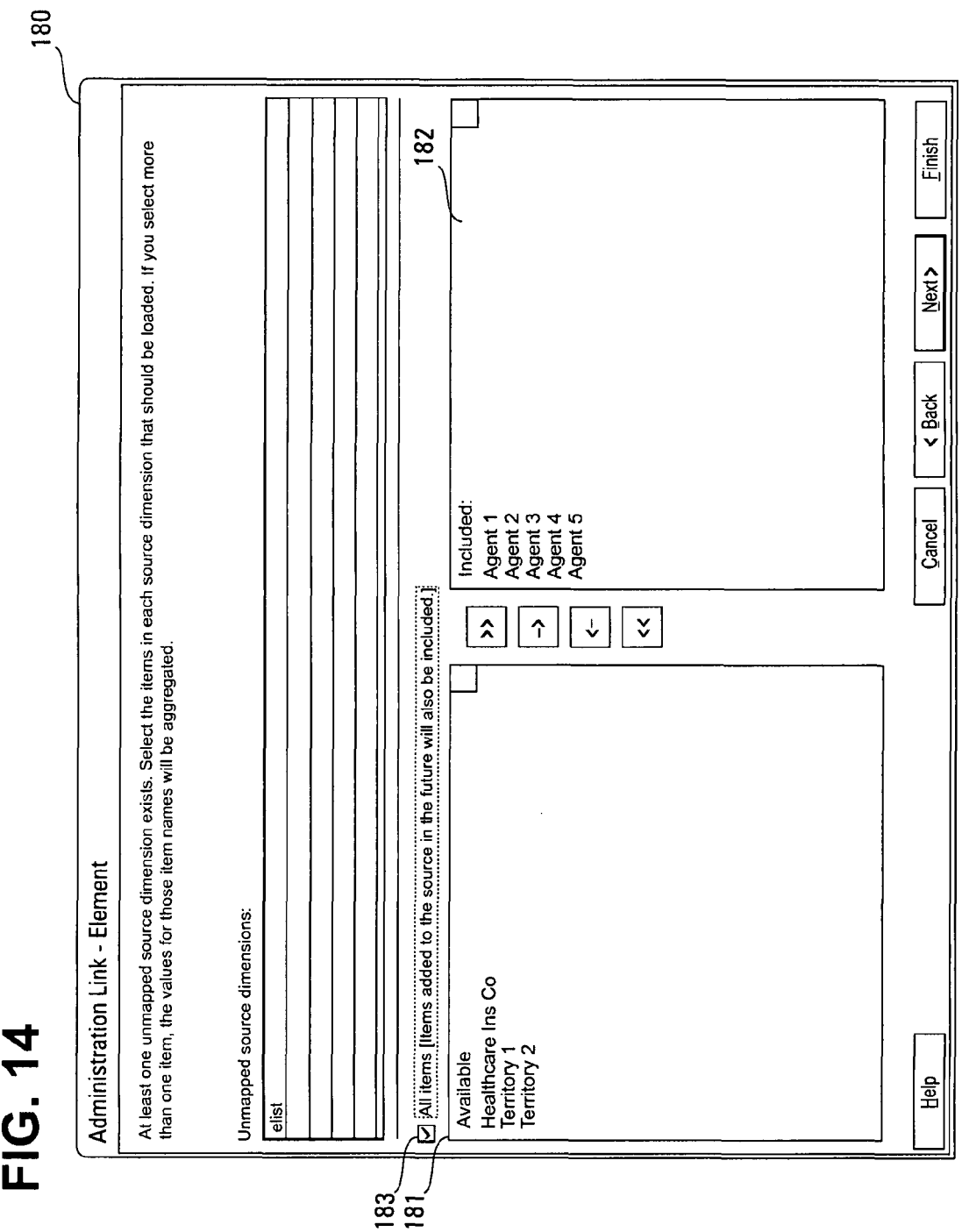

FIG. 15

Administration Link - Element

At least one unmapped target dimension exists. Select the items in each target dimension that should be loaded with data. The same value will load into all items you select.

Unmapped Target Dimensions:

Versions

☑ All detail items [Detail items added to the target in the future will also be included.]

Available:
Budget Version 2

Included:
Budget Version 1

Administration Link - Element ☒

Would you like to add another element?

Yes    No

Help    Cancel    < Back    Next >    Finish

JOB SCHEDULING FOR AUTOMATIC MOVEMENT OF MULTIDIMENSIONAL DATA BETWEEN LIVE DATACUBES

This application is a continuation-in-part of and claims priority to U.S. patent application Ser. No. 11/103,902, filed Apr. 12, 2005. This application also claims the benefit of U.S. Provisional Application Ser. No. 60/910,077, filed Apr. 4, 2007, the entire content of both applications are incorporated herein by reference.

TECHNICAL FIELD

The invention relates to software systems and, in particular, enterprise software systems.

BACKGROUND

Enterprise software systems are typically sophisticated, large-scale systems that support many, e.g., hundreds or thousands, of concurrent users. Examples of enterprise software systems include financial planning systems, budget planning systems, order management systems, inventory management systems, sales force management systems, business intelligence tools, enterprise reporting tools, project and resource management systems and other enterprise software systems.

In many situations, an enterprise may maintain multiple enterprise software systems. The enterprise software systems typically create and maintain separate multidimensional databases to collect and manage information to support the business processes. Each of the enterprise software systems is "current" from the perspective of their respective users. An enterprise often desires to share data between the different enterprise software systems. As one example, the user may wish to move multi-dimensional data from a financial planning system to a reporting system.

One conventional technique for moving the multidimensional data is to export the multidimensional data from one enterprise software system to the second enterprise software system. During this process, it is often required to "freeze" or "lock down" the first entire enterprise software system in order to export consistent data. As one example, some software systems must be brought offline before any export can be initiated to prevent any updates or data changes during the export process. During this process, users of the first enterprise software system are prevented from accessing and utilizing the software system.

Moreover, the multidimensional data often must be exported to an offline "staging area" of the second enterprise planning system. The staging area acts a temporary holding area while the multidimensional data can be processed and merged into the second enterprise planning system. As a result, conventional techniques for sharing data between enterprise software systems are often cumbersome and time-consuming.

SUMMARY

In general, the invention is directed to techniques for moving multidimensional data between software systems, such as enterprise software systems. Specifically, the techniques provide mechanisms for defining inter-system "links" for automatically moving data among different databases associated with the enterprise software systems. In order to automatically move data among the different databases, a link control module formulates work elements that, when executed, move multidimensional data among the different data cubes of different enterprise models, possibly for different enterprise software systems.

As used herein, the term "link" generally refers to a software element (e.g., control information) that maps multidimensional data from one data source to another data source. For example, a link may map multidimensional data from one or more source enterprise software systems to one or more destination software systems. As another example, a link may map multidimensional data between multiple databases of a single enterprise software application. In addition to specifying the source and destination databases, each link provides a link definition that controls any data transformations to be applied when moving the multidimensional data. In this manner, the links control the mapping and synchronization of the multidimensional data, including control of past and future time versioning and dimensionality of the shared data.

In general, the links may be activated manually or embedded within macros to run at specific times or in response to certain events. Macros can be chained together, allowing links to be defined for moving data between multiple databases in a sequence.

Multiple levels of granularity are supported by different forms of links. For example, administrative links may be defined to move larger data sets associated with multiple users. In addition, user-controlled links may be defined on a per-user basis to move user-specific data.

In one embodiment, a method comprises defining a link from a first software application to a second software application, wherein the link specifies a source area of a multidimensional database associated with the first software application and a target area of a multidimensional database associated with the second software application. The method further comprises automatically formulating one or more work elements that, when executed, move multidimensional data from the source area to the target area in accordance with the link. The method also comprises executing the work elements In another embodiment, a system comprises a first database storing multidimensional data for a first software application, and a second database storing multidimensional data for a second software application. The system further includes an interface by which an administrator defines a link that specifies a source area of the first database and a target area of the second database. The system also comprises a link control module that automatically formulates one or more work elements that, when executed, move multidimensional data from the source area to the target area in accordance with the link. In addition, the system comprises a set of one or more processors that execute the work elements.

In another embodiment, a computer-readable medium comprises instructions to cause a processor to present a user interface to receive input that specifies a mapping from one or more source items in a source model to one or more target items in a target model. The instructions further cause the processor to automatically formulate one or more work elements that, when executed, move multidimensional data in the source model that are associated with the source items of the source data cube to the target items of the target model. In addition, the instructions cause the processor to cause one or more other processors to execute the work elements.

The invention may provide one or more advantages. For example, in some embodiment, the techniques may be used to automatically move multidimensional data between enterprise software systems while the software systems remain active. As a result, users of the respective enterprise software systems may continue to interact with the systems.

In addition, the techniques may allow an enterprise to utilize an efficient set of enterprise databases that are architected with the appropriate size and dimensionality for the associated business processes. As a result, the enterprise need not utilize a single, monolithic database that stores all of the multidimensional data for the enterprise.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 6-15 are exemplary screen illustrations of a user interface for defining, maintaining and monitoring enterprise software links described herein.

DETAILED DESCRIPTION

Figure 1:
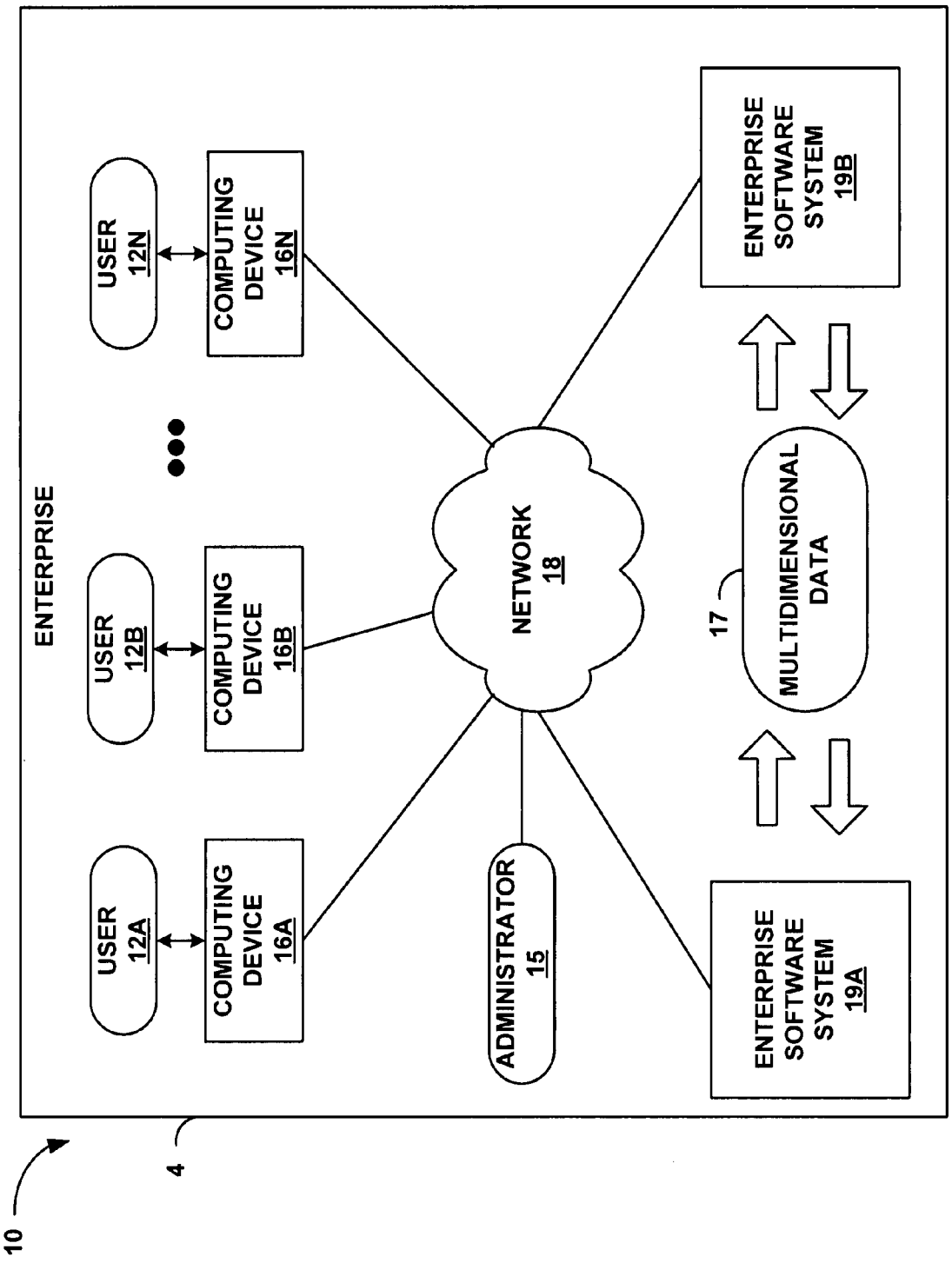
FIG. 1 is a block diagram illustrating an example computing environment in which users interact with a plurality of enterprise software systems.

FIG. 1 is a block diagram illustrating an example computing environment 10 in which a plurality of users 12A-12N (collectively, "users 12") interact with a plurality of enterprise software systems 19A and 19B (collectively "enterprise software systems 19"). In the system shown in FIG. 1, enterprise software systems 19 are communicatively coupled to a number of computing devices 16A-16E (collectively, "computing devices 16") by a network 18.

Enterprise users 12 may use a variety of computing devices 16 to interact with enterprise software systems 19 via network 18. For example, an enterprise user 12 may interact with enterprise software systems 19 using a laptop computer, desktop computer, or the like, running a web browser, such as Internet Explorer™ from Microsoft Corporation of Redmond, Wash. Alternatively, an enterprise user may use a personal digital assistant (PDA), such as a Palm™ organizer from Palm Inc. of Santa Clara, Calif., a web-enabled cellular phone, or similar device.

Network 18 represents any communication network, such as a packet-based digital network like the Internet. In this manner, computing environment 10 can readily scale to suit large enterprises. Enterprise users 12 may directly access enterprise software systems 19 via a local area network, or may remotely access enterprise software systems 19 via a virtual private network, remote dial-up, or similar remote access communication mechanism.

In general, enterprise software systems 19 may be any type of enterprise software system that utilizes multidimensional data. For example, the techniques described herein may be readily applied to order management systems, inventory management systems, sales force management systems, business intelligence tools, enterprise reporting tools, project and resource management systems and other enterprise software systems.

For exemplary purposes, the invention is described in reference to an enterprise planning system, such as an enterprise financial or budget planning system. In particular, it is assumed that enterprise software system 19A represents a large-scale, web-based enterprise planning system. Enterprise software system 19B may also represent an enterprise planning system for planning other business processes. Alternatively, enterprise software system 19B may be any other type of enterprise software system.

In this example, enterprise software system 19A enables and automates the reconciliation of top-down targets with detailed bottom-up forecasts for an enterprise. Enterprise software system 19A implements and manages an enterprise planning process, which generally consists of three functions: (1) modeling, (2) contribution and (3) reconciliation.

Initially, high-level enterprise managers or executives, referred to as analysts, define organizational targets, and build planning models for the enterprise. The analysts may include, for example, financial analysts, such as the chief financial officer, senior financial analysts or product and sales analysts. More specifically, the analysts develop a model having a number of hierarchically arranged nodes representing various cost centers within the organization, such as business units or departments. The analysts then specify corporate target data for each node of the organizational hierarchy. Corporate target data may include financial data, revenue data, order data, inventory data, and the like, depending on the particular enterprise planning activity being carried out by the enterprise. The analysts then assign one or more enterprise users 12 to each node, such as managers, supervisors, sales representatives, lab managers, or the like, that are responsible for enterprise planning for the cost center corresponding to the node. Each enterprise user 12 may be designated as a contributor that provides planning data to enterprise software system 19A, a reviewer that accepts or rejects contributions from the contributors, or both. The contributors and reviewers may be authorized users within the enterprise or within other entities coupled to network 18, such as suppliers or customers.

The enterprise users 12 that are designated as contributors interact with enterprise software system 19A to input detailed forecasts in the form of contribution data. As described above, enterprise users 12 may provide detailed financial forecasts, revenue forecasts, order forecasts, inventory forecasts, estimated resource requirements, and the like, depending on the particular enterprise planning activity being carried out by the enterprise.

Enterprise software system 19A automates the reconciliation of the forecast data with the corporate target data provided by the analysts. In particular, enterprise software system 19A operates in accordance with a defined model, i.e., the enterprise planning model created by the analysts, to provide a hierarchical planning process having multiple reconciliation levels. As each of the contributors provides his or her contribution data (referred to generally, as "enterprise data"), enterprise software system 19A automatically aggregates the contribution data across the enterprise in real-time, and provides access to the aggregated data to enterprise users 12 designated as reviewers associated with higher levels of the enterprise. In particular, upon receiving contribution data from the contributors, enterprise software system 19A identifies all higher levels of the organizational model affected by the newly received contribution data, and calculates new aggregate totals at each level in real-time.

Consequently, the reviewers view aggregated data across the enterprise in real-time during the enterprise planning session. At each level, enterprise software system 19A ensures that the reviewers, as defined by the nodes of the enterprise model, reconcile the target data with the forecast data. Each of the reviewers may, for example, reject or accept the contribution data in view of corporate targets provided by the analysts. This process continues until the contribution data is ultimately approved by the highest level of the organizational hierarchy, thereby ensuring that the contribution data from the contributors reconciles with corporate targets provided by the analysts.

In this manner, enterprise software system 19A may provide more accurate enterprise planning than with conventional techniques. For example, enterprise software system 19A may improve the accuracy and predictability of enterprise planning by enabling organizations to reconcile corporate models and organizational targets with detailed forecasts. The techniques may provide a platform that delivers collaborative, real-time planning capabilities, without requiring offline consolidation and aggregation of forecasts. Because enterprise software system 19A can aggregate contribution data in real-time, all users 12 can be presented with an accurate, up-to-date view of the numbers. Further, the architecture of enterprise software system 19A can readily scale to thousands of users, and may be designed around best planning practices. In addition, the techniques enabling high participation by enterprise users 12, i.e., the contributors and reviewers, allowing accurate planning cycles to be reduced.

Enterprise software system 19A may utilize a "cut-down" process by which the multidimensional data store is "sliced" for each user 12 in accordance with the defined enterprise model. During this process, enterprise software system 19A identifies areas of the defined model to which users 12 are assigned, either as contributors or reviewers, and "slices" the data store based on the assignments. When a given user 12 logs in and proceeds with an enterprise planning activity, enterprise software system 19A communicates the respective data slice to the respective computing device 16 for display to the user via the extended spreadsheet application. In this fashion, enterprise software system 19A need not communicate the entire model to each of users 12, thereby reducing communication time as well as resource requirements. Instead, each user 12 receives only relevant information. Users 12 interact with computing devices 16 to capture contribution data, and to reconcile the contribution data with organizational targets.

As described herein, enterprise software systems 19 provides interfaces by which administrator 15 defines "links" for automatically moving multidimensional data 17 between the enterprise software systems. As used herein, the term "link" generally refers to software element that maps data from one or more source enterprise software systems to one or more destination software systems. In this example, administrator 15 may define links for moving multidimensional data 17 from enterprise software system 19A to enterprise software system 19B. Similarly, administrator 15 may define links for moving multidimensional data 17 from enterprise software system 19B to enterprise software system 19A. Although illustrated for exemplary purposes as moving multidimensional data 17 from a single source enterprise software system to a single destination, the techniques described herein may readily be applied to move multidimensional data from one or more source enterprise software systems to one or more destination systems.

In addition to specifying the source and destination databases, administrator 15 may configure each link to specify one or more data transformations to be automatically applied when moving multidimensional data 17. In this manner, administrator 15 may define the links to control the mapping and synchronization of multidimensional data 17 between enterprise software systems 19, including control of past and future time versioning and dimensionality as the data is stored in each of the enterprise software systems.

In general, the links may be activated manually or automatically. For example, administrator 15 may interact with enterprise software systems 19 to define macros for automatically invoking the links at specific times or in response to certain events. Moreover, administrator 15 may chain together the macros, thereby defining an automated sequence of links for moving data between multiple databases.

As described in further detail below, enterprise software systems 19 allow administrator 15 to define the links with various levels of granularity. For example, administrator 15 may define a set of "administrative links" for moving larger data sets associated with multiple users 12. An administrative link, for example, may be defined to map one or more source items to one or more different target items. As used in this disclosure, the term "item" refers to a label for a set of data along a dimension of a multidimensional dataset. For example, a multidimensional dataset may have two dimensions: a "product" dimension and a "manufacturer" dimension. In this example, "items" along the "product" dimension may include "drills", "hammers", and "saws." Items along the "manufacturer" dimension may include "Acme", "Best", and "Top Tools". In this example, data cells in the multidimensional data may indicate the numbers of products in stock made by various manufacturers. For instance, a data cell in the multidimensional data at the "drills" item in the "product" dimension and at the "Acme" item in the "manufacturer" dimension may indicate the value "20". The data in this data cell thereby indicates that there are twenty Acme drills in stock.

The source items specified by an administrative link may be associated with the same or different source enterprise models. Similarly, the target items may be associated with the same or different target enterprise models. An administrative link that specifies movement of multidimensional data from a plurality of source models to a plurality of target models may be executed as a link job having multiple work elements.

In addition, administrator 15 may define "user links" on a per-node basis to move multidimensional data associated with one node of the organizational hierarchy from one data cube to another data cube, i.e., single source single target. Individual users 12 may invoke the user links to initiate movement of multidimensional data 17 that is specific to a slice of the enterprise model to which the user has access. Enterprise software system 19A may, for example, present a user interface by which any of users 12 can initiate automated movement and transformation of multidimensional data 17 related to data slices associated with nodes of the organizational hierarchy with which users 12 are associated.

Figure 2:
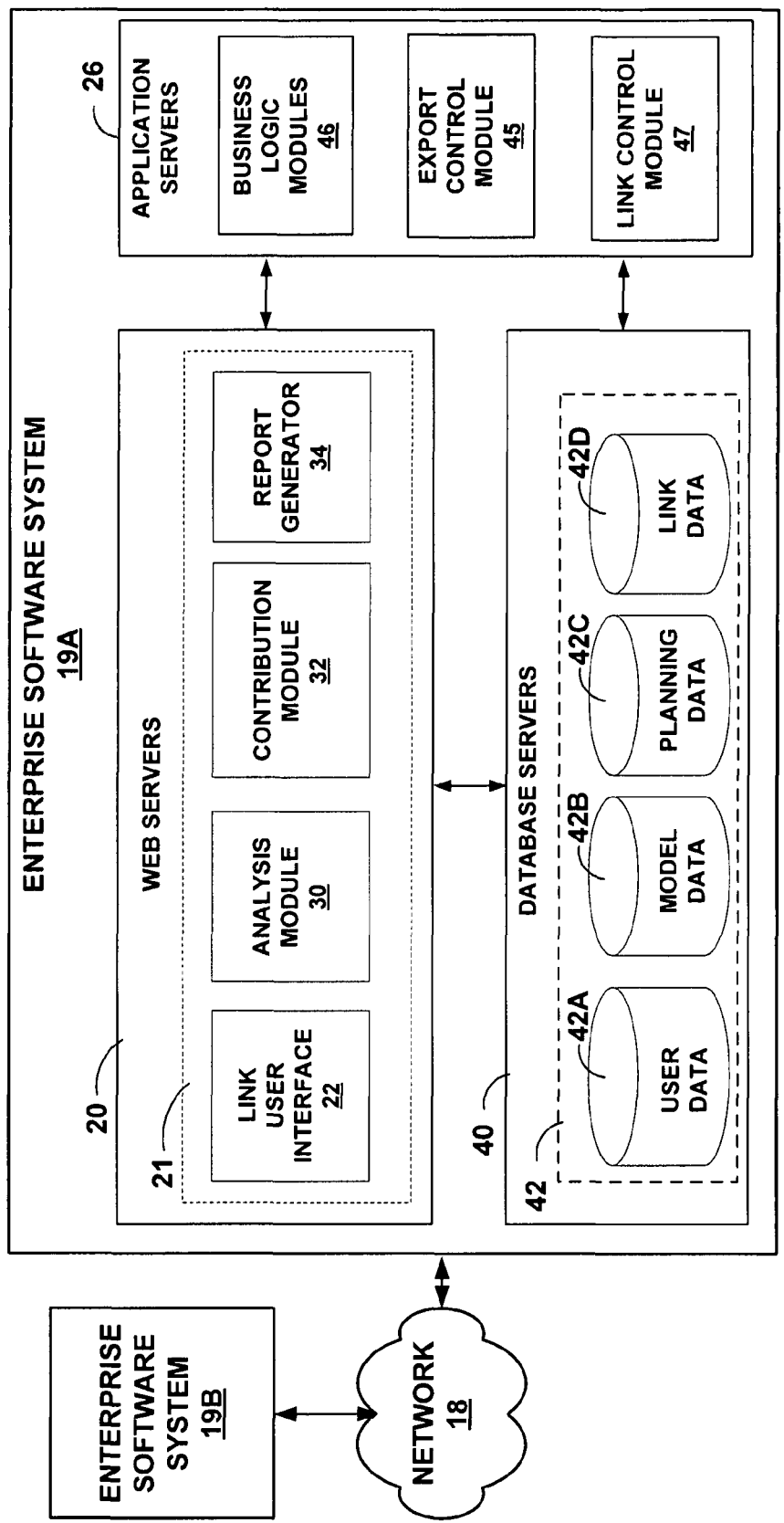
FIG. 2 is a block diagram illustrating one example embodiment of an enterprise software system in further detail.

FIG. 2 is a block diagram illustrating one embodiment of enterprise software system 19A in further detail. Again, for purposes of illustration, enterprise software system 19A is described in reference to an enterprise planning system, such as an enterprise financial or budget planning system. In the illustrated example, enterprise planning system 19A includes web servers 20, application servers 26 and database servers 40.

In general, web servers 20 provide an interface for communicating with users 12 via network 18. Web servers 20 execute web server software, such as Internet Information Server™ from Microsoft Corporation, of Redmond, Wash. As such, web servers 20 provide an environment for interacting with contributors, analysts, and reviewers according to software modules 21, which include link user interface 22, analysis module 30, contribution module 32, and report generator 34.

Software modules 21 typically take the form of instructions stored on computer-readable media for execution by one or more processors. Software modules 21 may comprise Visual Basic modules, Java scripts, Java Applets, Active Server Pages, web pages written in hypertext markup language (HTML) or dynamic HTML, Active X objects, documents conforming to the extensible markup language (XML) or other data description language, and other suitable modules. Web servers 20 serve up web pages defined by software modules 21, and communicate the web pages to computing devices of enterprise users 12. The web pages may include static media, such as text and graphic imagery, as well as conventional input media such as text entry boxes, radio buttons, drop-down menus, grids, spreadsheets and the like, for receiving information from enterprise users 12.

Software modules 21 interact with database servers 40 to access enterprise data 42 including user data 42A, model data 42B, planning data 42C and link data 42D. Enterprise data may be stored in a number of different forms including one or more data storage files, or one or more database management systems (DBMS) executing on one or more database servers. Furthermore, although illustrated separately, enterprise data 42 could be combined into a single database or other data storage structure. Enterprise data 42 could, for example, be implemented as a single relational database, such as SQL Server from Microsoft Corporation.

User data 42A reflects links to information for each of users 12, including the name, email address, and other contact information for the user. Model data 42B stores the enterprise planning models defined by analysts. For example, model database 42B stores information that defines the reconciliation process developed by the analysts, including the number of reconciliation levels, the various "nodes" in the hierarchy, and a contributor associated with each node. Planning data 42C stores the actual contribution data (i.e., "enterprise data") for each of the nodes for one or more planning sessions. Link data 42D stores data that defines links for automatically moving portions of multidimensional planning data 42C from enterprise software system 19A to enterprise software system 19B. In particular, link data 42D identifies and maps portions of planning data 42C to one or more multidimensional databases within enterprise software system 19B.

Referring again to software applications 21, link user interface 22 presents an interface with which administrator 15 interacts to define the links. In particular, administrator 15 interacts with link user interface 22 to specify a name and description for each link. In addition, administrator 15 may configure the link to define a data mapping by selecting source and target enterprise software applications, source and target multidimensional data cubes, and particular source and target dimensions. Moreover, administrator 15 may specify a mapping between individual items of the source and target dimensions, thereby controlling mapping and aggregation of the multidimensional data. Moreover, administrator 15 may interact with link user interface 22 to view status and execution information for each of the links.

Analysis module 30 includes one or more software modules for creating enterprise planning models, such as financial models for enterprise 4, to control the entire planning process. Contribution module 32 includes software modules for presenting a contribution interface for capturing contribution data from the contributors. Contribution module 32 captures and aggregates the contribution data across enterprise 4 in real-time, and provides access to the aggregated data to reviewers associated with higher levels of enterprise 4.

Report generator 34 includes analytical software modules that generate enterprise planning reports based on the contribution data received from the contributors and stored within planning data 42C. In particular, the analytical software modules allow users 12 to formulate complex queries for generating reports and performing other data analysis functions on the current data of the enterprise model. These software modules may be web-based modules having a browser interface, or may be stand-alone executable programs.

Business logic modules 46 execute within the operating environment provided by application severs 26 and provide functionality for accessing and processing the data stored within databases 42 in response to software modules 21. In particular, business logic modules 46 comprise software routines for implementing the enterprise planning functions, and are invoked by software modules 21.

Link control module 47 controls exportation and movement of portions of planning data 42C to one or more multidimensional databases within enterprise software system 19B in accordance with link data 42D. For example, link control module 47 may create one or more administrative jobs (link jobs) for automatically moving portions of planning data 42C in accordance with the link definitions maintained by link data 42D. During this process, link control module 47 may create the link jobs to invoke export control module 45, which controls the export of consistent data from planning data 42C based on the source cubes and dimensions specified by the links. Further details with respect to export control module 45 and the exportation of a consistent data set from planning data 42C are described in U.S. patent application Ser. No. 10/996,855, entitled "EXPORT QUEUE FOR AN ENTERPRISE SOFTWARE SYSTEM," filed Nov. 22, 2004, hereby incorporated by reference.

Figure 3:
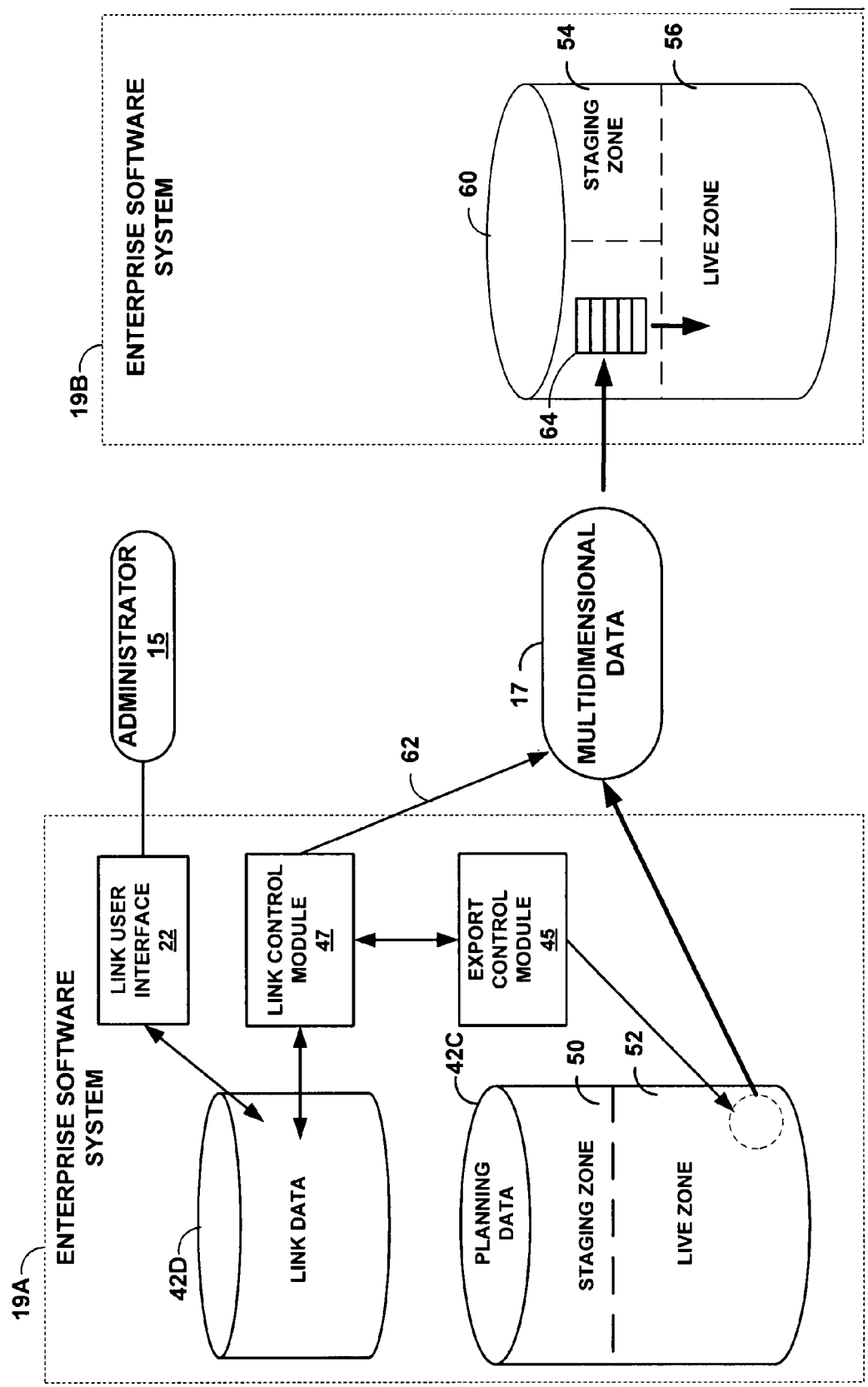
FIG. 3 is a block diagram illustrating an example multidimensional data transfer in further detail.

FIG. 3 is a block diagram illustrating an example multidimensional data transfer in further detail. In particular, FIG. 3 illustrates transfer of multidimensional data 17 from enterprise software system 19A to enterprise software system 19B in response to activation of an administrative link.

As illustrated in FIG. 3, planning data 42C includes a staging zone 50 and a "live zone" 52. In general, live zone 52 stores active planning data that is "current" from the perspective of users 12 of enterprise software system 19A. In contrast, staging zone 50 may be used as a temporary holding area while multidimensional data can be processed and merged into enterprise software system 19A. Similarly, enterprise software system 19B includes a database 60 having a staging zone 54 and a live zone 56.

In the example of FIG. 3, administrator 15 defines an administrative link to move multidimensional data 17 from live zone 52 of enterprise software system 19A to live zone 56 of enterprise software system 19B. For instance, link control module 47 (e.g., by way of the jobs created by link control module 47) may coordinate with export control module 45 to move multidimensional data 17 from enterprise software system 19A create one or more target data import blocks. These target data import blocks may contain the data to be copied from enterprise software system 19A (e.g., multidimensional data 17) to enterprise software system 19B. After creating a target data import block, link control module 47 may store the target data import block in import queue 64 of enterprise software system 19B. When a target data import block is stored in import queue 64, enterprise software system 19B directly imports the data in the target data import block into live zone 56 by processing the target data import block. In other words, link control module 47 may not need to perform any further processing on a target data import block after storing the target data import block in import queue 64. In this way, multidimensional data 17 may effectively bypass staging zone 54 of enterprise software system 19B.

Figure 4:
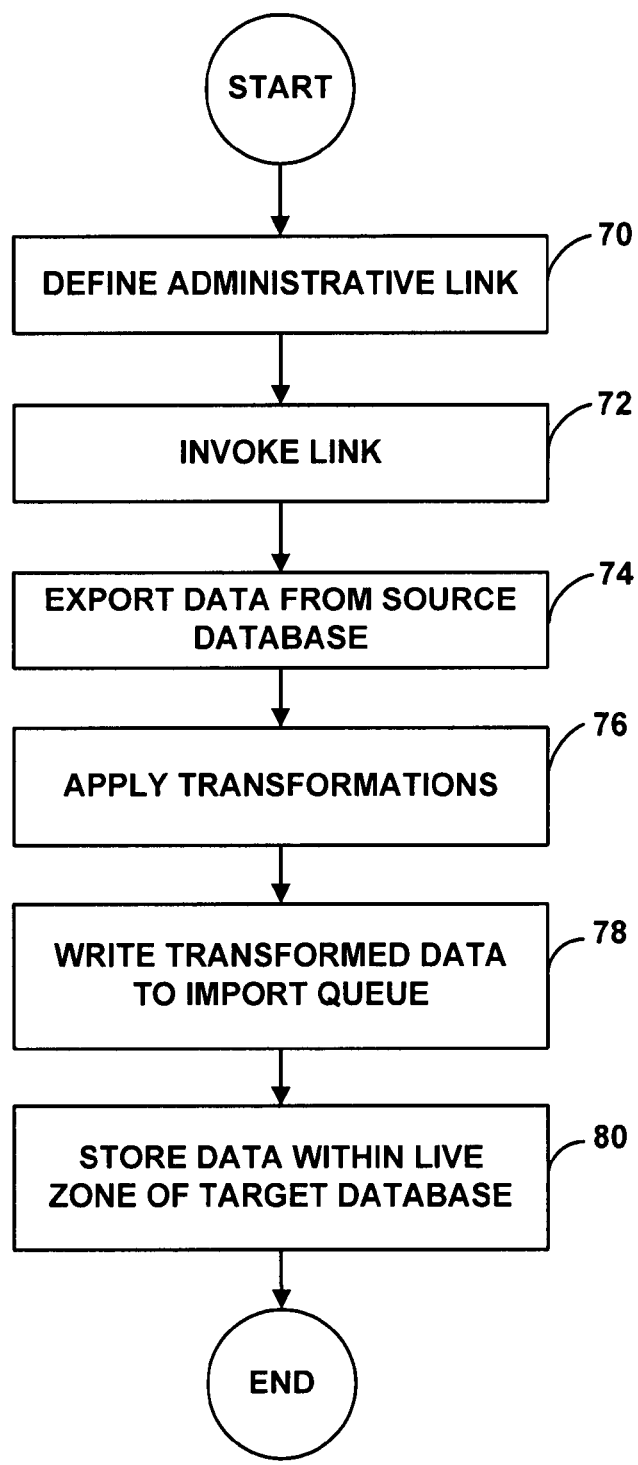
FIG. 4 is a flowchart illustrating exemplary operation of an enterprise software system.

FIG. 4 is a flowchart that describes exemplary operation of enterprise software system 19A with respect to the example of FIG. 3 in further detail. Initially, administrator 15 interacts with link user interface 22 to define an administrative link (70). As described, administrator 15 interacts with link user interface 22 to specify a name and description for each link. In addition, administrator 15 configures the link to define a data mapping from planning data 42C to database 60 as well as any transformations and aggregation to be applied to multidimensional data 17 during the move.

Next, link control module 47 invokes the link either in automated fashion in response to an internal or external system event or specified time period or in response to a manual request from administrator 15 (72). For instance, link control module 47 may access link data 42D to retrieve the link definition supplied by administrator 15. Link control module 47 may then direct export control module 45 to generate a target data import block (74). The target data import block may be a consistent subset of planning data 42C. Furthermore, when export control module 45 generates the target data import block, export control module 45 may performs one or more transformations on the subset of planning data 42C. For example, link control module 47 (or the created link job) may compute aggregate totals from source items of planning data 42C.

Once export control module 45 (or a link job created by link control module 47) creates the target data import block exported, link control module 47 stores the target data import block to import queue 64 (78). After link control module 47 writes stores the target data import block to import queue 64, enterprise software system 19B may store data in the data import block directly into live zone 56 in accordance with the dimensionality of database 60 (80). In this manner, enterprise software system 19B need not perform data manipulation or otherwise transform multidimensional data 17.

Figure 5:
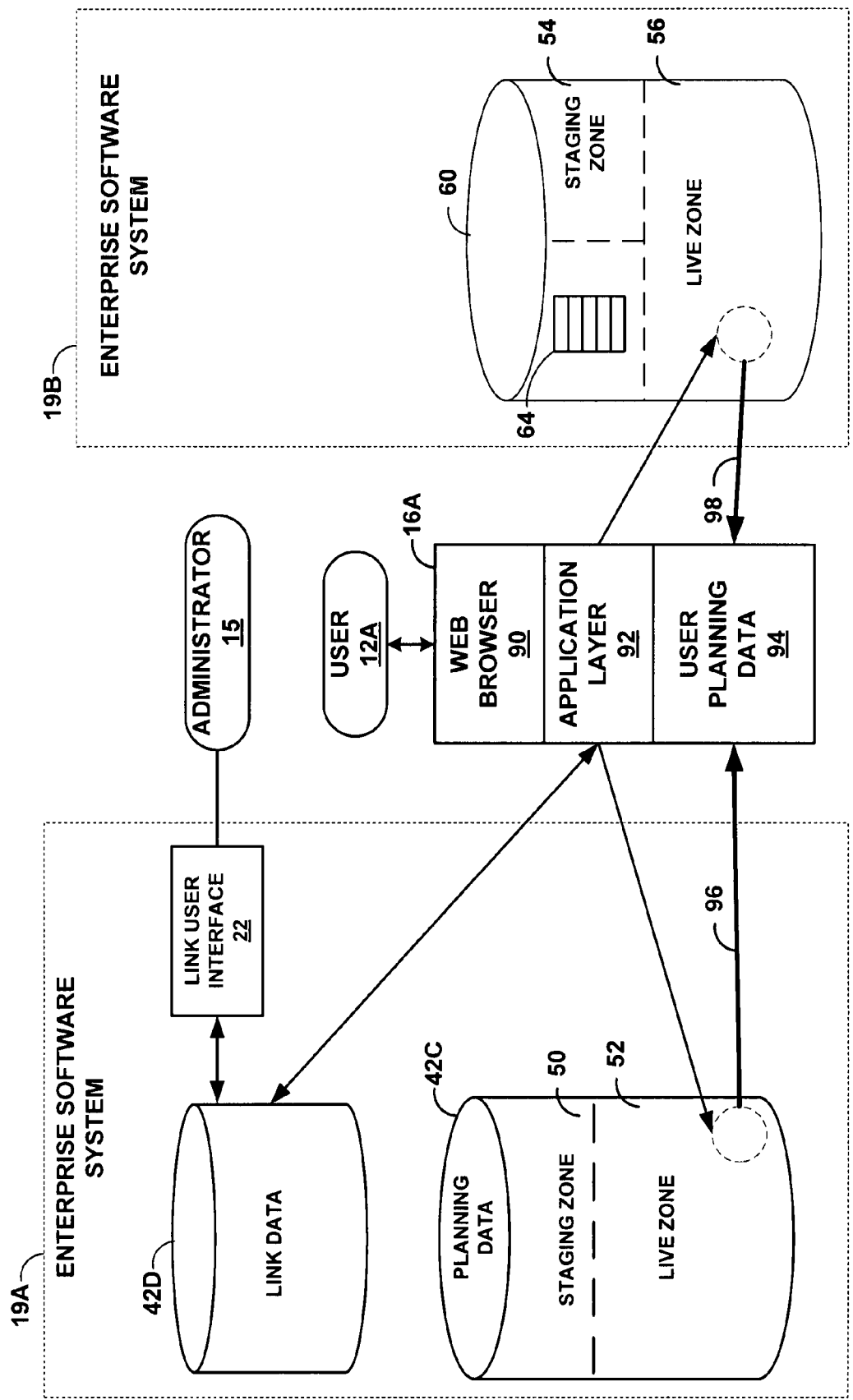
FIG. 5 is a block diagram illustrating another example of a multidimensional data transfer.

FIG. 5 is a block diagram illustrating another example of a multidimensional data transfer. In particular, FIG. 5 illustrates transfer of multidimensional data 17 from enterprise software system 19A to enterprise software system 19B in response to activation of a user link.

In the example of FIG. 5, administrator 15 interacts with link user interface 22 to define a user-controlled link. In particular, administrator 15 defines a user link that maps multidimensional data from live zone 52 of enterprise software system 19A to live zone 56 of enterprise software system 19B. However, administrator 15 defines the link as a "user link," thereby allowing users, such as user 12A, to manually activate the link for their respective portion of planning data 42C.

Initially, user 12A accesses enterprise software system 19A via computing device 16A. In this example, computing device is illustrated to include a web browser 90 or other user interface layer software. In addition, computing device 16A includes application layer 92 that represent business layer software for carrying out the planning process.

At the request of user 12A, application layer 92 retrieves personal planning data 96 for the user, i.e., the "slice" of the planning data 42C associated with the user. Application layer 92 downloads and stores the requested slice as user planning data 94. In addition, application layer 92 downloads the user link from link data 42D for which user 12A is authorized.

Next, user 12A manually invokes the user link, thereby directing application layer 92 to retrieve additional node-specific multidimensional data 98 from live zone 56 of enterprise software system 19B. Often, user 12A need not even know of the source database from which multidimensional data 98 was retrieved as administrator 15 defined and configured the user link. Application layer 92 performs a consistent read of multidimensional data 98 from live zone 56 and downloads multidimensional data 98. After downloading multidimensional data 98, application layer 92 generates a target data import block based on multidimensional data 98. When application layer 92 generates the target data import block, application layer 92 may perform transformations and mappings as specified by the user link. Next, application layer 92 may integrate the target data import block into user planning data 94.

Application layer 92 then stores user planning data 94, including multidimensional data 98 retrieved from database 60, to planning data 42C when user 12A performs a save.

Figure 6:
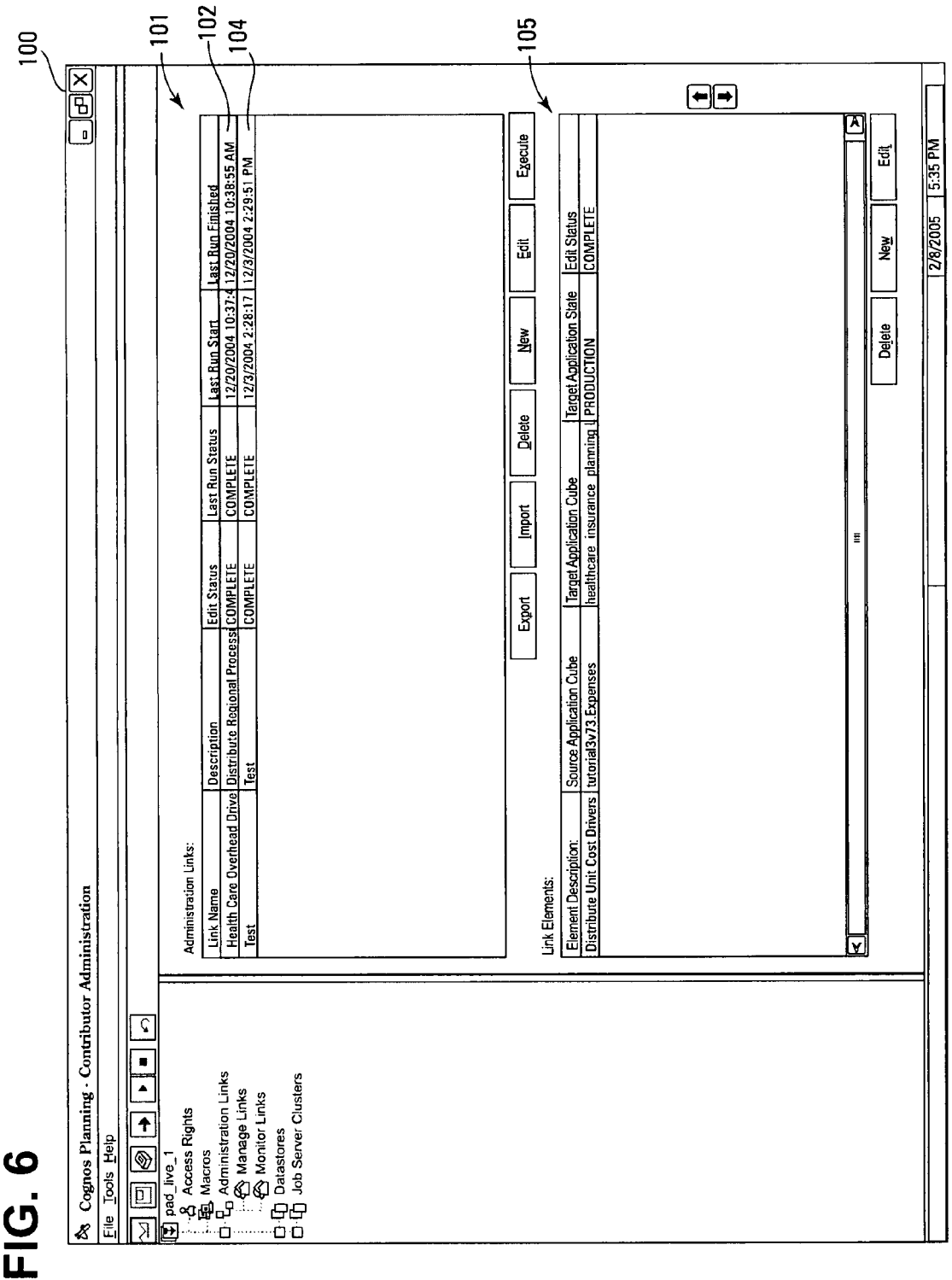

FIGS. 6-15 are exemplary screen illustrations presented by link user interface 22 for defining, maintaining and monitoring enterprise software links described herein. For example, FIG. 6 is a screen illustration of an example user interface 100 listing administrator links 102, 104. As illustrated, user interface 100 includes a display region 101 that lists a link name, description, edit status, last run status, an execution start time and an execution end time for each of links 102, 104. In addition, user interface 100 includes display region 105 that lists mapping information for a selected one of the links listed within display region 101. In this example, display region 105 presents mapping information for link 102, which is selected within display region 101. In particular, display region 105 lists a description of the elements associated with link 102, a source multidimensional cube, a target multidimensional cube and an edit status for the link.

Figure 7:
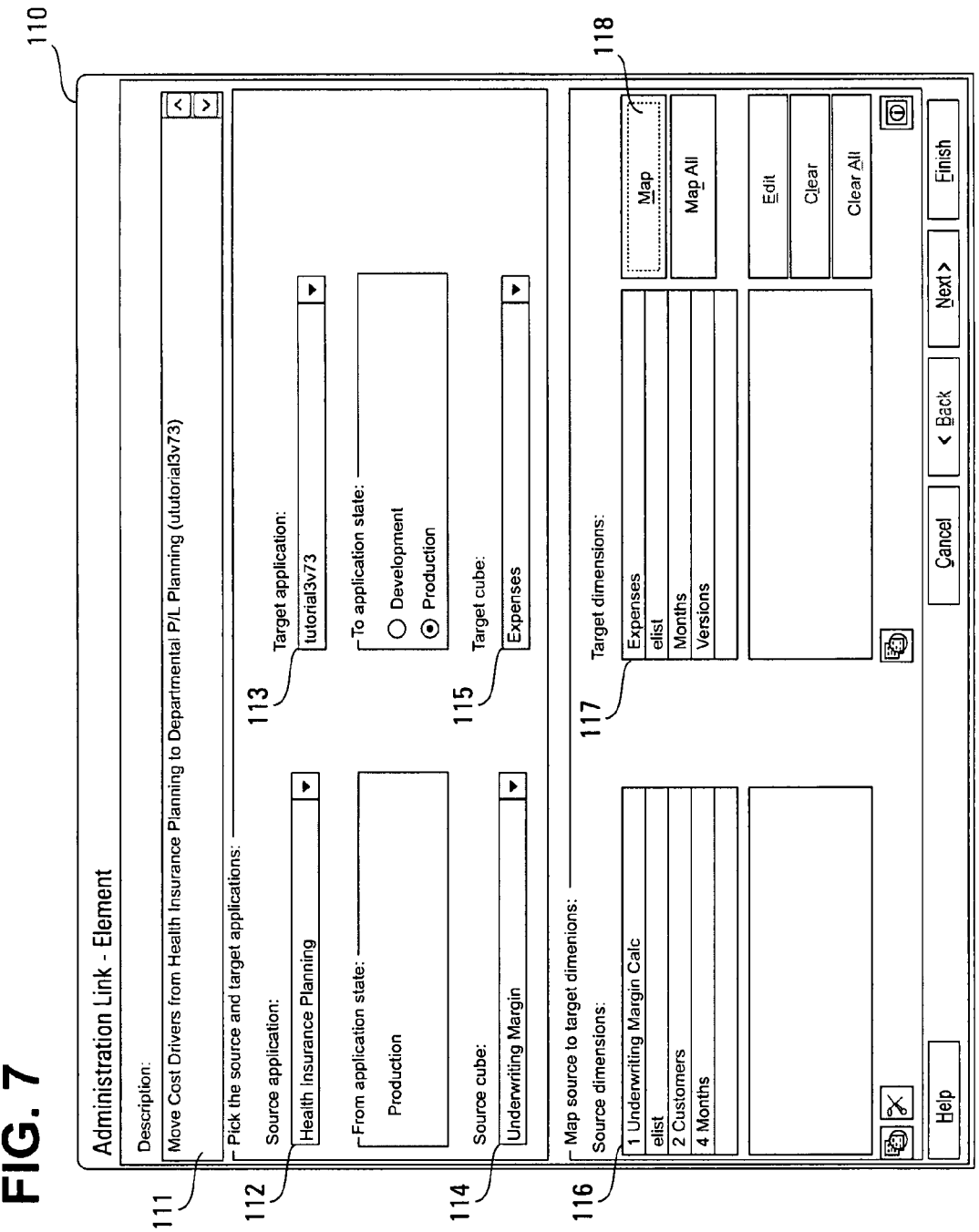
Figure 8:
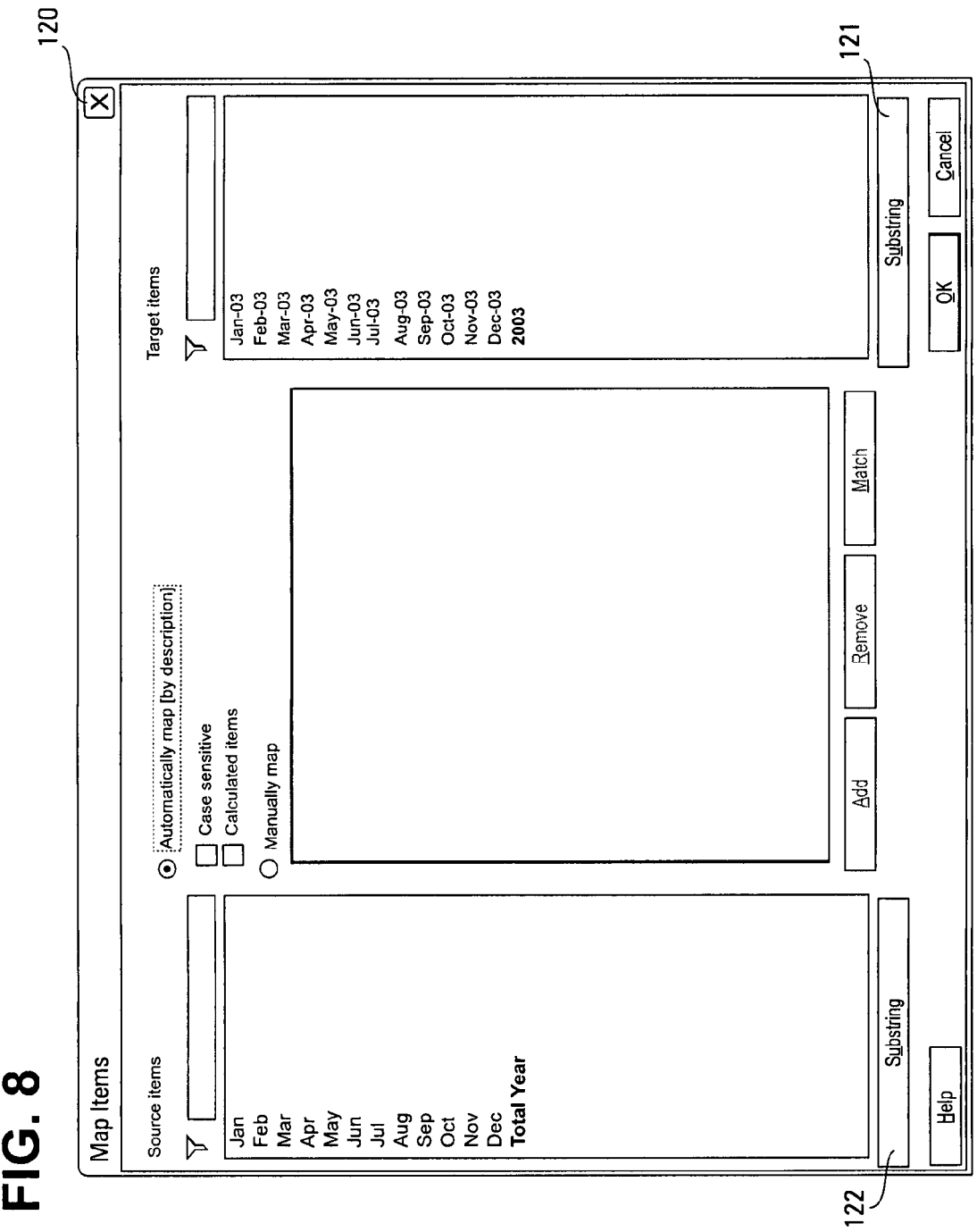

FIG. 7 is a screen illustration of an example user interface 110 with which administrator 15 interacts to create a new administrative link. In this example, user interface includes an input area 111 for receiving a description of link being created. In addition, input areas 112, 113 allow administrator 15 to select a source enterprise software application and a target enterprise software application, respectively.

User interface 110 further includes input areas 114, 115 for selection a source data cube from the source software application and a target data cube for the target enterprise software application. For the selected cubes, input areas 116, 117 allow administrator 15 to map particular dimensions. Upon selecting map button 118, link user interface 22 presents user interface 120 (FIG. 8) that allows administrator 15 to map individual items from a source dimension to one or more items along a target dimension. In this example, administrator 15 maps items along a "4 months" source dimension to items along a "months" dimension of the target multidimensional cube.

Figure 9:
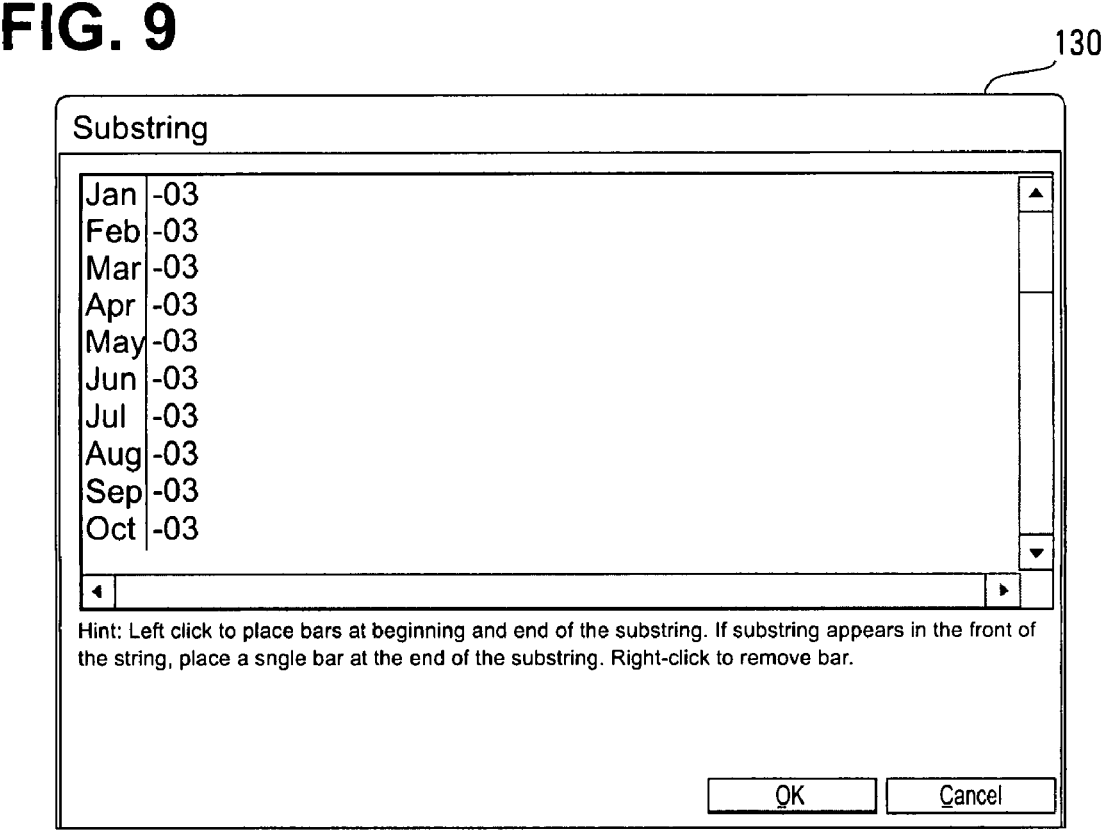
Figure 10:
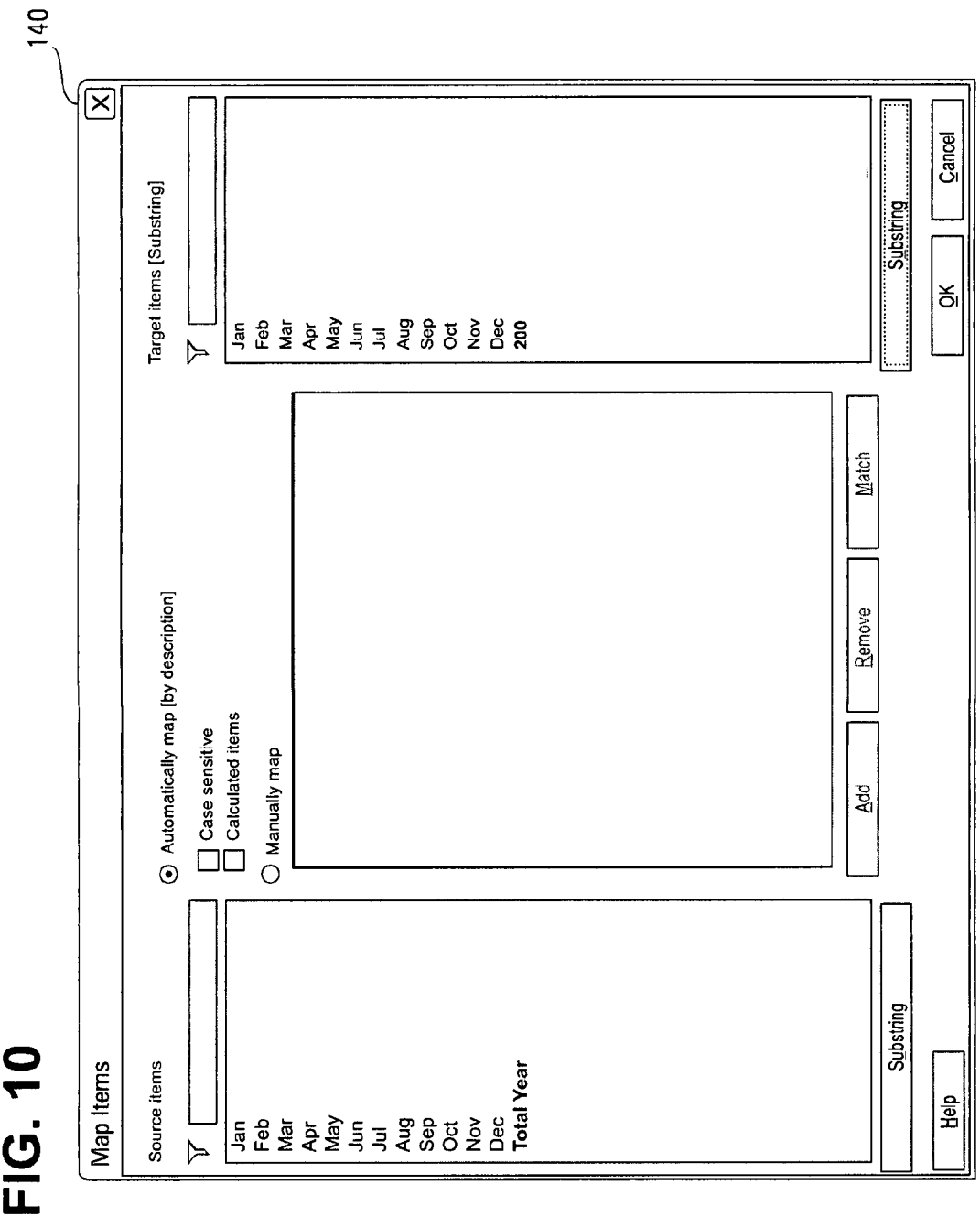

User interface 120 includes substring buttons 121, 122 that allow administrator 15 to perform link "filtering" via substring. In particular, substring buttons 121, 122 allow administrator 15 to define string-based transformations for individual items. FIG. 9, for example, illustrates a user interface 130 by which administrator 15 defines substrings within items for the target "months" dimension. In this example, administrator 15 defines the substring to eliminate the last three characters from each of the items. As a result, the source items and the target items have matching string names, as illustrated in user interface 140 of FIG. 10. This example illustrates one of several types of mapping and filtering capabilities that allow a user to match and map data. For example, link user interface 22 permits mapping as well as matching. Thus, the following are additional examples illustrating the filtering and mapping functionality: (a) mapping of "month 1" through "month 12" to "january-2008" through "december-2008" for a calendar year organization, (b) mapping "mon 1" through "mon 12" to "Jul 05" through "Jun 06" for a fiscal year organization, and (c) filtering and mapping "2005_January" to match "Jan" through use of a substring selecting only the 6th through 8th digit.

Figure 11:
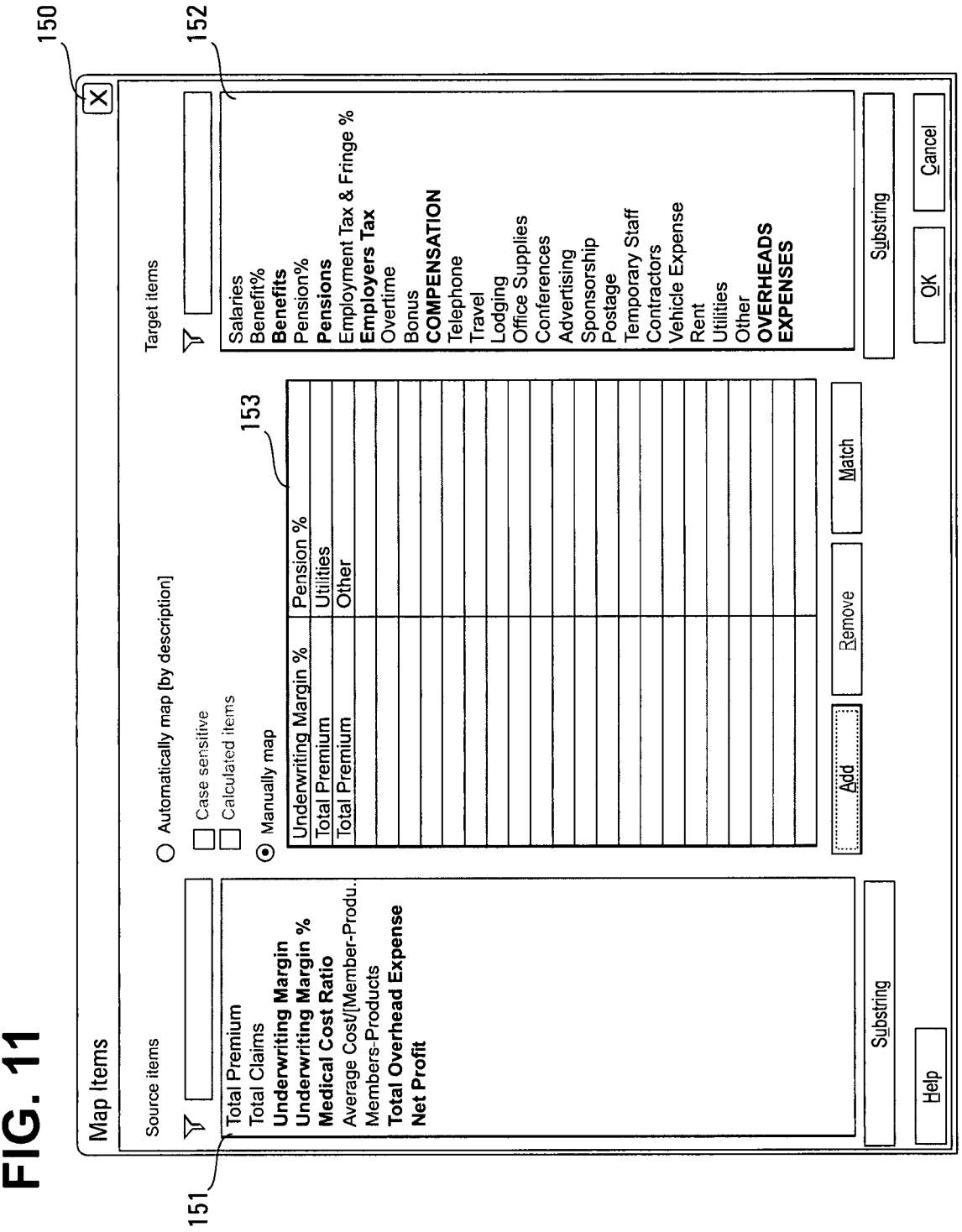

FIG. 11 is a screen illustration of an example user interface 150 in which administrator 15 has elected to manually map individual items between a source dimension and a target dimension. In particular, user interface 150 includes a display area 151 that lists source items along the source dimension, a display area 152 that lists target items along the target dimension, and a mapping area 153 that lists mapping information for the items.

In this example, administrator 15 has mapped source item "Underwriting Margin %" to the target item "Pension %." In addition, administrator 15 has mapped "Total Premium" source item to both "Utilities" and "Other" target items. In other words, amounts for the "Total Premium" dimensional item of the source data cube will be stored to both the "Utilities" and "Other" target dimensional items of the target data cube. In this manner, administrator 15 may define a 1-to-1 mapping, an N-to-1 mapping, a 1-to-N mapping, an M-to-N mapping, or an N-to-N mapping from source items to target items, where M and N are different integers.

Figure 12:
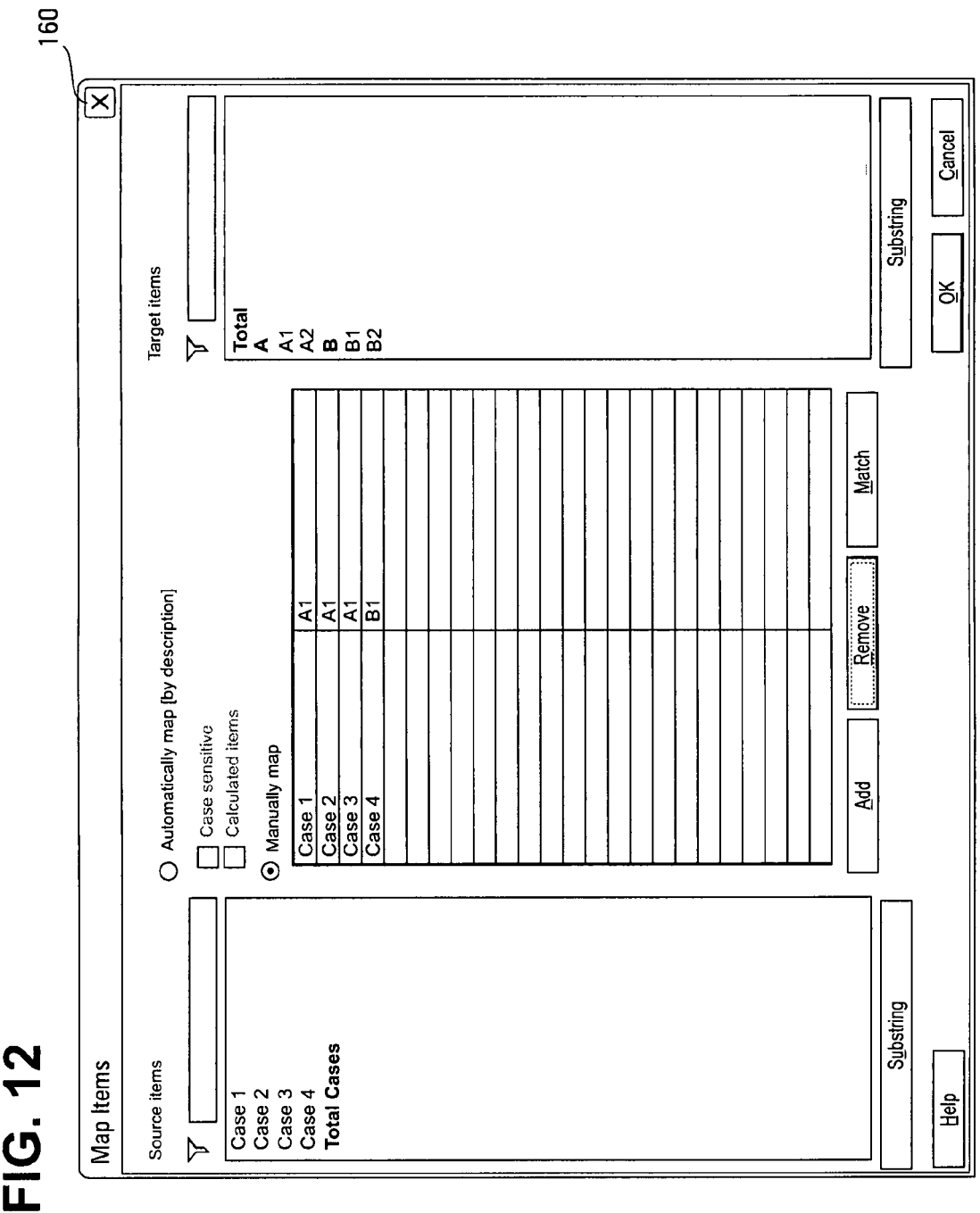

FIG. 12 is a screen illustration of an example user interface 160 in which administrator 15 has defined a manual mapping of source items "Case 1," "Case 2" and "Case 3" to target item "A1." In this manner, administrator 15 may define an N-to-1 data aggregation to be carried out when the link is invoked. In addition, administrator 15 has mapped source item "Case 4" to target item "B1."

FIG. 13 is a screen illustration of an example user interface 170 in which three dimensions 172 have been mapped between the source and target multidimensional data cubes. User interface 170 also indicates that source dimension 173 and target dimension 174 have not been mapped.

FIG. 14 is a screen illustration of an example user interface 180 with which administrator 15 interacts to handle unmapped source dimensions. As illustrated, user interface 180 includes a display area 181 that lists available items for the unmapped dimension, and a display area 182 that lists items of the dimension to be included and available for aggregation and data movement. In this example, administrator 15 has enabled selection box 183, thereby specifying that all future items added to the source dimension will also be included. In similar, manner, FIG. 15 is a screen illustration of an example user interface 190 with which administrator 15 interacts to handle unmapped target dimensions. Presenting unmapped target dimensions ensures that administrator 14 will apply business decision-making to decide whether to only some or all items on the unmapped target dimensions will receive the data values computed by the link.

Figure 16:
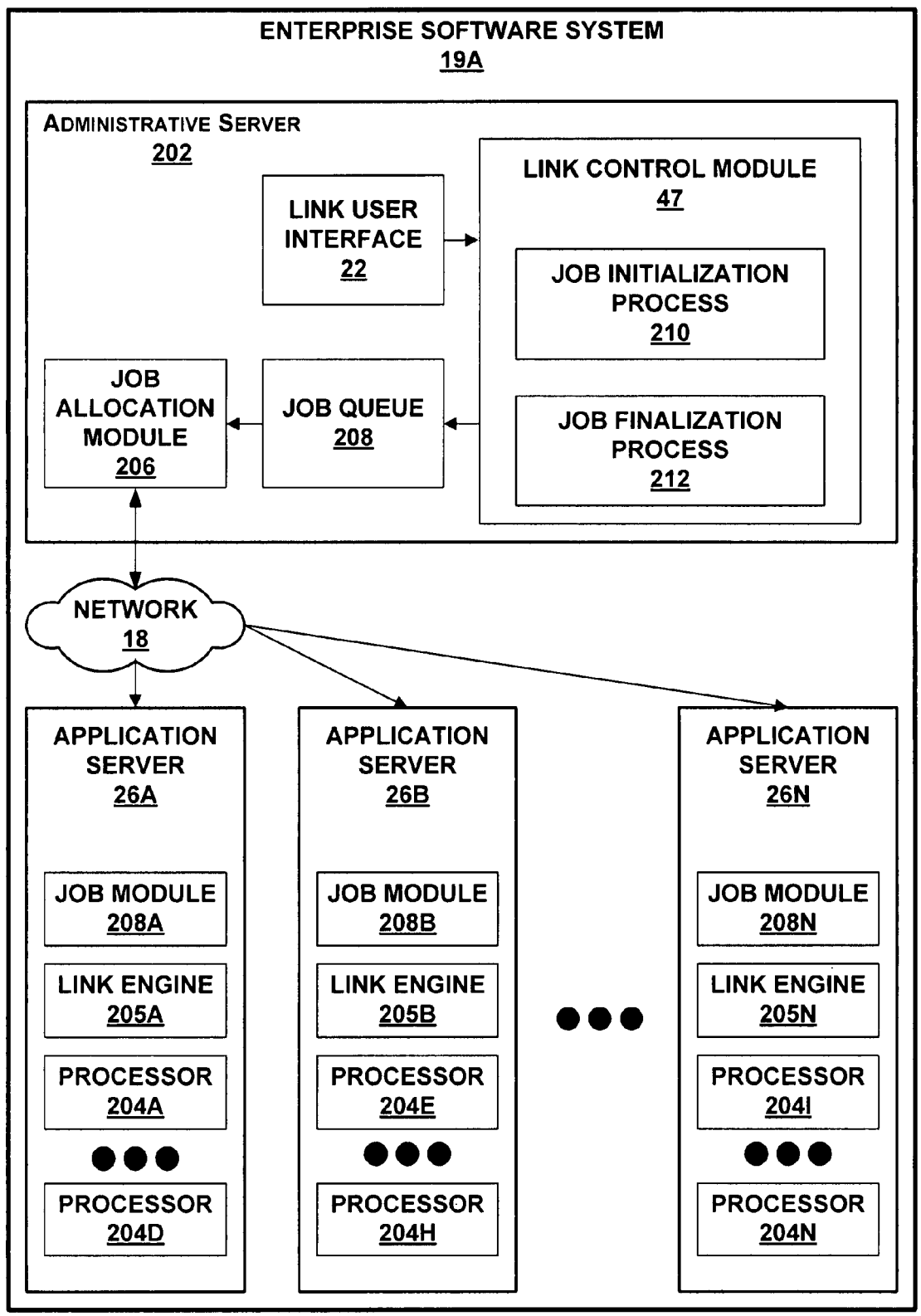
FIG. 16 is a block diagram illustrating additional elements of an enterprise.

FIG. 16 is a block diagram illustrating in further detail elements of enterprise software system 19A for processing jobs to move data among different databases associated with the enterprise software systems. As illustrated in the example of FIG. 16, enterprise software system 19A may further include an administrative server 202 coupled by network 18 to a plurality of application servers 26 (also shown in FIG. 2). Administrative server 202 provides an operating environment for executing software applications that perform administrative functions. In this example, administrative server 202 provides an operating environment for executing link user interface 22, link control module 47, and a job allocation module 206. In addition, administrative server 202 may include data storage modules (e.g., random access memory, disk drives, etc.) that store data used by the administrative functions. For instance, administrative server 202 may include a memory module that stores a job queue 208.

Furthermore, in the example of FIG. 16, each of application servers 26 in enterprise software system 19A may include one or more processors 204A through 204N (collectively, "processors 204"). For instance, application server 26A may include processors 204A through 204D, application server 26B may include processors 204E through 204H, and so on. Each of processors 204 may be microprocessors, application-specific integrated circuits, or other types of programmable processors capable of executing software instructions.

As described above, link control module 47 controls the movement of portions of planning data 42C to one or more multidimensional databases within enterprise software system 19B in accordance with link data 42D. In order to control the movement of data specified by a link (e.g., a user link or an administrative link), link control module 47 generates a "link job." A link job may specify one or more work elements for moving multidimensional data. For example, for an administrative link that specifies multiple work elements to move multidimensional data from a plurality of source models to a plurality of target models, link control module 47 may initially create a link job that specifying each of the work elements.

In addition to the work elements, the link job defines a job initialization process and a job finalization process. For purposes of explanation, FIG. 16 shows administration server 202 executing a job initialization process 210 of a link job currently being performed. However, any link job, and its constituent components of a job initialization process, work elements and job finalization process, may execute on any of application servers 26. In general, job initialization process 210 executes on administrative server 202 or one of the application servers 26 to create and control the execution of the work elements for the given link job. Once created, the individual work elements of the link job are allocated across application servers 26, as described in further detail below. Job initialization process 210 may, for example, initialize job modules 208A through 208N (collectively, "job modules 208") and link engines 205A through 205N (collectively, "link engines 205") in application servers 26 to carry out the work elements defined for a given the link job. The job finalization process for a given link job executes on one of the application servers 26 upon completion of all of the work elements for that link job.

When preparing a link job for execution (e.g., in response to a triggering event), link control module 47 may generate the data structure defining the link job, generate data structures to define the work elements, and add these work elements to the link job. A work element may be viewed as a data structure that specifies one or more source items in a source enterprise model and one or more target items in target enterprise model. For example, as illustrated in the example of FIG. 11, a "Total Premium" item in the "underwriting margin calc" dimension of the "underwriting margin" data cube is mapped to a "Utilities" item in an "expenses" dimension of an "expenses" data cube. In this example, a work element may specify the "Total Premium" item as a source item and the "Utilities" item as a target item. Moreover, the source enterprise model and target enterprise model may be associated with different enterprise software systems, e.g., systems 19A, 19B.

When link control module 47 generates a link job and any associated work elements, link control module 47 may add the work elements to job queue 208. Job queue 208 may comprise a data structure that stores one or more work elements. Job allocation module 206 removes work elements from job queue 208 and assigns the work elements to various ones of application servers 26A through 26N. Alternatively, application servers 26 may monitor job queue 208 and retrieve work elements for link jobs based on resource loading of the application servers. Work elements assigned to application servers 26A through 26N cause job modules 208 An through 208N and link engines 205A through 205N on respective ones of application servers 26A through 26N to execute the work elements, i.e., to move multidimensional data associated with the source items specified by the work element into the target items specified each of the work elements.

As described herein, link control module 47 generates link jobs and the work elements specified for each link job to improve efficiencies of performing the data movements. In general, a single link may map one or more source items to one or more target items. An administrative link, for example, may map two different source items to three different target items. Moreover, the source items may be associated with the same or different source enterprise models; similarly, the target items may be associated with the same or different target enterprise models. Link control module 47 analyzes the link definition, determines the relationships of the source items and target items, and divides the work of executing the link among multiple work elements. For example, if a link maps a first source item to a first target item and a second target item, and if the link maps a second source item to a third target item, link control module 47 may divide the work of performing this link in various ways. For instance, link control module 47 may generate a first work element that specifies movement of data between the first source item and the first and second target items, and may generate a second work element that specifies movement of data between the second source item and the third target item. Alternatively, link control module 47 may generate a first work element that specifies movement of data between the first source item and the first target item, and may generate a second work element that specifies movement of data between the first and second source items and the second and third target items.

The way in which link control module 47 divides the work of executing a link among work elements may have a significant impact on how quickly the link is executed. For example, when one of link engines 205 executes a work element, the link engine may extract source items specified by the work element from a source model. Extracting the source items may be a computationally expensive operation because, in order to extract the source items, the link engine may be required to load a source model and at least one data cube of the source model. When the link engine loads a data cube, numerous values in the data cube may need to be calculated. All of these operations may take considerable time. However, link control module 47 may attempt to reduce the overall computational expense of loading the source model and the target model by dividing the work of executing a link among work elements such that these computational expenses are minimized. Link control module 47 may attempt to minimize these computational expenses by minimizing the number of times each source item is extracted from the source model and by minimizing the number of work elements required to execute a link. The following figures and associated description illustrate example operations by which link control module 47 may attempt to generate work elements such that these computational expenses are minimized.

Figure 17:
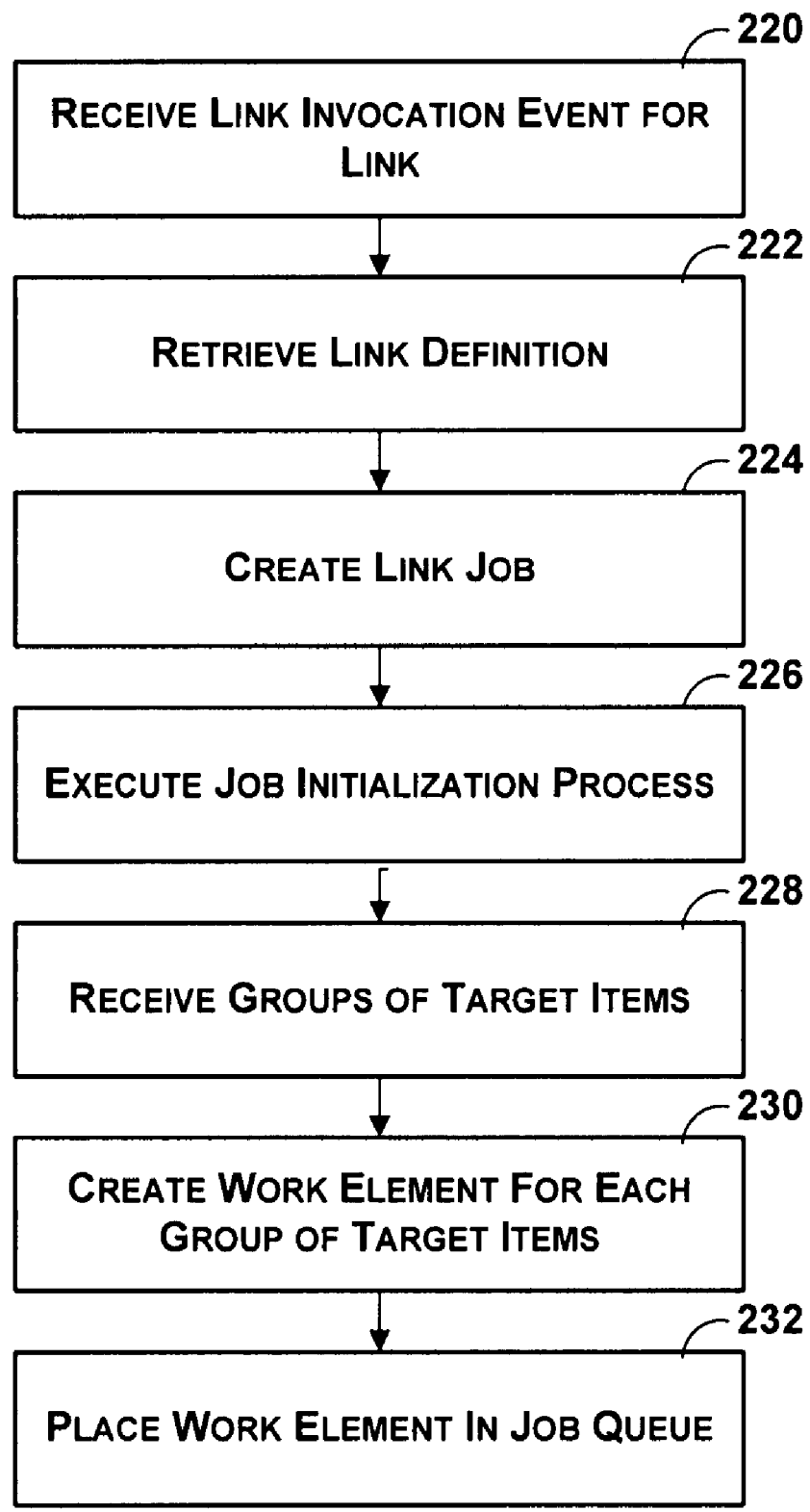
FIG. 17 is a flowchart illustrating an exemplary operation of a link control module.

FIG. 17 is a flowchart illustrating an exemplary operation of link control module 47. Initially, link control module 47 may receive a system event to invoke a link (220). For example, link control module 47 may receive the system event when one of users 12 requests the execution of the link or may receive the system event from an automated process. After receiving this system event, link control module 47 may retrieve a link definition of the link from link data 42D (222). Link control module 47 may then use the link definition to create a new link job (224). As discussed above, a link job may be a data structure that specifies parameters for job initialization process 210, one or more work elements, and a job finalization process 212. Job initialization process 210 may execute on administrative server 202 or any of application servers 26 before any of the work elements, and may serve to set up data structures needed by the work elements in order to operate. Job finalization process 212 may execute after all of the work elements of a link job are processed. Link control module 47 may add work elements to a link job after the link control module has created the link job.

Figure 18:
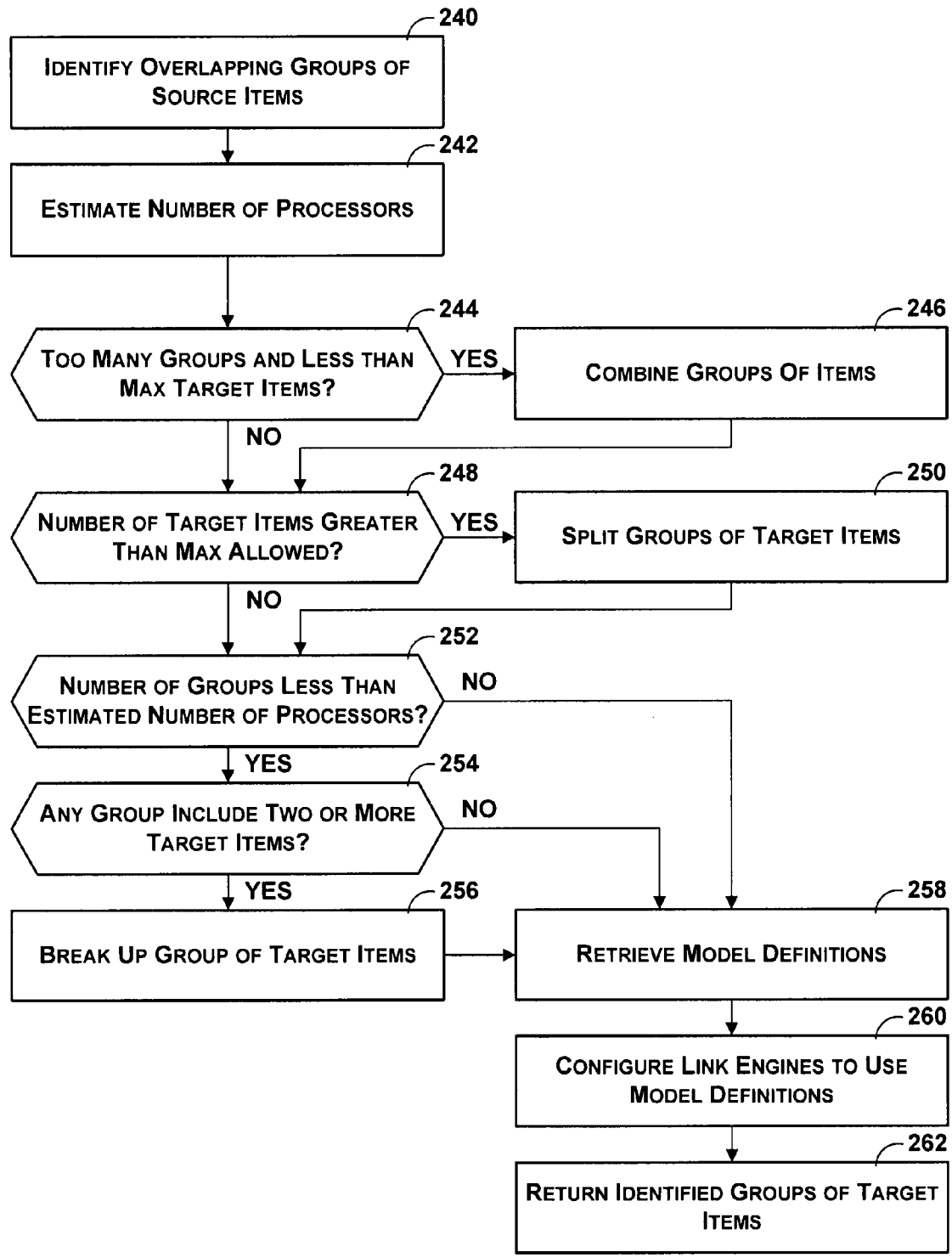
FIG. 18 is a flowchart illustrating an exemplary operation of a job initialization process.

After creating the new link job, link control module 47 may cause administrative server 202 to execute job initialization process 210 for the new link job (226). Job initialization process 210 causes administrative server 202 to identify the one or more groups of target items and to generally set up application servers 26. After job initialization process identifies the one or more groups of target items, link control module 47 may receive data that indicate the identified groups of target items (228). Each group of target items may specify one or more of the target items specified by the link. FIG. 18, below, provides an example operation of job initialization process 210.

Next, link control module 47 creates an individual work element for each of the groups of target items received from job initialization process 210 (230). Each of the work elements may specify the target items in one or more of the groups of target items and any source item that the link maps to those target items. After link control module 47 creates a work element for each of the groups of target items, link control module 47 may place each of the individual work elements units associated with the link job in job queue 208 (232). Job allocation module 206 may then remove work elements from job queue 208 and allocate the work elements to any one of application servers 26 that is configured to process the work element.

FIG. 18 is a flowchart illustrating an exemplary operation of job initialization process 210. Initially, job initialization process 210 identifies groups of target items that have overlapping groups of source items (240). For example, suppose that item A, item B, and item C are target items and suppose that items X, Y, and Z are source items. In this example, source items X and Y may be mapped to target item A, item Z may be mapped to target item B, and item X may be mapped to target item C. Because the link maps source item X to target item A and to target item C, the groups of source items mapped to target item A and target item C overlap. For this reason, the job initialization process may identify target items A and C as a group of target items. In addition, job initialization process 210 may identify target item B as a separate group of target items. Job initialization process 210 identifies groups of target items that contain one or more common source items because it may only be necessary to load the common source items once in order to execute a work element that specifies the common source items. In contrast, if a link maps one source item to two target items and the target items were not grouped, it may be necessary to load the source item twice. Because it may be computationally expensive to load source items, it may be advantageous to reduce the number of times source items are loaded when executing a link.

After identifying groups of target items that are mapped to a common set of source items, job initialization process 210 may estimate a number of available processors in application servers 26 (242). For example, enterprise software system 19A may include two application servers 26A and 26N. Based on input from administrator 15, job initialization process 210 may estimate that both application server 26A and application server 26N include four processors. Hence, job initialization process 210 may estimate that application servers 26 include eight processors. In another example, job initialization process 210 may interrogate each of application servers 26 in order to determine how many how many application servers are in enterprise software system 19A or to determine how many processors are included in each of application servers 26.

Next, job initialization process 210 may determine whether there are too many groups of target items (244). For example, job initialization process 210 may determine that there are too many groups of target items when the estimated number of processors in application servers 26 is significantly less than the number of groups of target items. If job initialization process 210 determines that there are too many groups of target items ("YES" of 244), job initialization process 210 may combine two or more of the groups of target items into a single group of target items (246). For example, a first group of target items may include target items A and B and a second group of target items may include target items C and D. If job initialization process 210 estimates that there is only one available processor, job initialization process 210 may combine the first group and the second group. In this way, a single group of target items may include target items A, B, C, and D. After combining two or more of the groups of target items, job initialization process 210 may loop back and again determine whether there are still too many groups of target items (244).

Combining groups of target items in this way reduces the number of groups of target items and thereby reduces the number of work elements. Because the number of work elements is reduced, there may be a reduction in the number of times that job modules 208 invoke link engines 205. Reducing the number of times that job modules 208 invoke link engines 205 may increase performance because it may be computationally expensive to invoke link engines 205. However, it may not be advantageous to reduce the number of work elements below the number of available processors. This is because link engines 205 executing on the processors may be able to perform the work elements in parallel.

When job initialization process 210 determines that there are not too many groups of target items ("NO" of 244), job initialization process 210 may determine whether the number of target items in any of the groups of target items is greater than a maximum permitted number of target items allowed in a single group of target items (248). Administrator 15 may set the maximum permitted number of target items based on the memory capacity of application servers 26. If each of application servers 26 includes large memory capacities, administrator 15 may the set the maximum permitted number of target items to a relatively high value because each of application servers 26 may store more target items in memory.

If the number of target items in one of the groups of target items is greater than a maximum number of target items permitted in a single group of target items ("YES" of 248), job initialization process 210 may split this group of target items into two or more groups such that none of the groups of target items include more target items than the maximum number of target items permitted in a single group of target items (250). For example, suppose that administrator 15 has set the maximum number of target items allowed in a single group of target items at ten. In this example, a group of target items may include twenty-four target items. Because twenty-four target items exceeds the maximum number of allowed target items in a group of target items, job initialization process 210 may split this group of target items into three groups of eight target items.

After splitting the group of target items into two or more groups, job initialization process 210 may loop back and again determine whether the number of target items in any of the groups of target items is greater than a maximum number of target items allowed in a single group of target items (248).

If there is no group of target items that includes more target items than the maximum number of target items allowed in a single group of target items ("NO" of 248), job initialization process 210 may determine whether the number of groups of target items is less than the estimated number of processors in each of application servers 26 (252). If job initialization process 210 determines that the number of groups of target items is less than the estimated number of processors in each of application servers 26 ("YES" of 252), job initialization process 210 may determine whether any of the groups of target items includes two or more target items (254). If at least one of the groups of target items includes two or more target items ("YES" of 254), job initialization process 210 may break up one or more groups of target items into two or more groups of target items such that the number of groups is no longer less than the estimated number of processors (256).

After breaking up a group of target items into two or more groups of target items, or if none of the groups of target items includes two or more target items ("NO" of 254) or if the number of target items is greater than or equal to the estimated number of processors in application servers 26 ("NO" of 252), job initialization process 210 then proceeds to retrieve a model definition of the source model specified by the link and a model definition of the target model specified by the link (258). Job initialization process 210 then configures one or more of link engines 205 to use the model definitions (260). After configuring the ones of link engines 205, job initialization process 210 may return the identified groups of target items to link control module 47 for generation of the work elements to be inserted in job queue 208 and allocated to the configured application servers (262).

Figure 19:
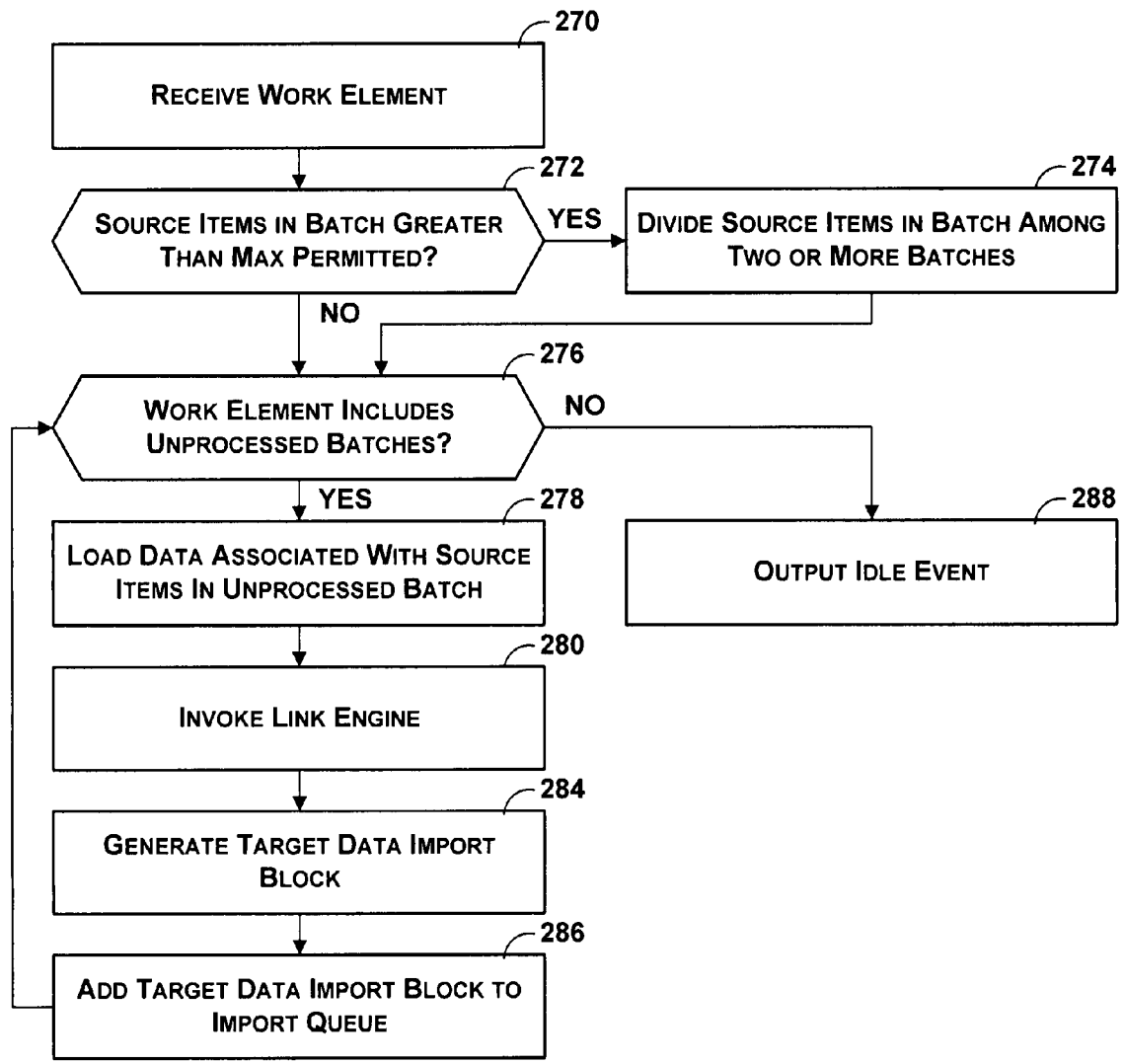
FIG. 19 is a flowchart illustrating an exemplary operation of a job module and a link engine when performing a work element.

FIG. 19 is a flowchart illustrating an exemplary operation of one of job modules 208 and one of link engines 205 when executing a work element. For purposes of explanation, FIG. 19 is explained in reference to job module 208A and link engine 205A. Nevertheless, any of job modules 208 and link engines 205 may perform this example operation.

Initially, job module 208A may receive a work element from job allocation module 206 (270). When job module 208A receives the work element, all of the source items specified in the work element are within a single "batch." As used in this disclosure, a "batch" is a set of source items that may be processed in a single operation. After receiving the work element, job module 208A may determine whether the number of source items in a batch is greater than a maximum number of source items permitted in a single batch (272). For example, administrator 15 may provide a link tuning parameter that specifies that a batch may not include more than ten source nodes. Administrator 15 may set the maximum number of target items allowed in a single batch based on memory limitations of application servers 26. For example, the memory modules of application servers 26 may only have enough capacity to store multidimensional data associated with ten source items. In this example, if a work element specifies fifteen source items, the memory module of the application server to which the work element was assigned would not be capable of storing the multidimensional data associated with all fifteen source items.

If the number of source items specified by a batch in the work element is greater than the number of source items that may be processed in one batch ("YES" of 272), link control module 47 may divide the source items in the batch into two or more batches of source items (274). For example, if the maximum number of source items in a batch is ten and the work element specifies twenty source items, job module 208A may divide the source items into two batches, each of which specify ten source items.

After dividing the source items into batches or after determining that the number of source items specified by the work element is not greater than the number of source items that may be processed in one batch ("NO" of 272), job module 208A may determine whether there are any unprocessed batches in the work element (276). If there are unprocessed batches in the work element ("YES" of 276), job module 208A may invoke export control module 45 in order to load multidimensional data associated with the source items in one of the batches into a memory module of application server 26A (278). After job module 208A loads the data associated with the source items of a batch, job module 208A may invoke link engine 205A (280).

When invoked, link engine 205A may use the data associated with the source items to generate a target data import block that may be used to integrate data into the target model (284). After link engine 205A generates the target data import block, job module 208A may add the target data import block to an import queue of the target model for processing (286). The target data import block of the import queue of the target model are processed, as described above, to import and integrate the source data into the target model. During this process, link engine 205A may apply one or more transformations to the data associated with the source items in accordance with the link definition. For example, link engine 205A may add values of each source item mapped to a target item. Job module 208A may then loop back and determine whether there are any remaining unprocessed batches in the work element (276).

If there are no remaining unprocessed batches in the work element ("NO" of 276), job module 208A may output an event that alerts job allocation module 206 that job module 208A is available to execute another work element (288).

FIGS. 20A through 20F (collectively, "FIG. 20") illustrate various example links. Furthermore, FIG. 20 illustrate how job initialization processes for respective ones of the links may divide target items of the links among one or more groups of target items. In FIG. 20, source items and target items are represented as circles. An arrow represents a mapping from a source item to a target item. Boxes with dotted borders represent groups of target items as determined by the job initialization processes upon analyzing the link definitions. In the examples of FIGS. 20A-20F, job initialization process 210 estimates that there are four available processors in application servers 26. Furthermore, administrator 15 may limit the maximum number of target items in a work item to three target items.

Figure 20A:
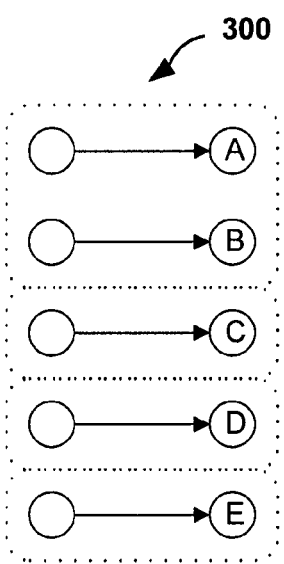
FIGS. 20A through 20F are block diagrams illustrating example mappings from source items to target items.

FIG. 20A illustrates an example link 300 that maps source items to target items on a one-to-one basis. In link 300 there are five source items and five target items. Link 300 maps each of the source items to exactly one target item. When a job initialization process of link 300 identifies overlapping groups of source items, the job initialization process of link 300 may initially identify five different groups of target items. The job initialization process of link 300 next determines that there are more groups of target items than there are processors in application servers 26. For this reason, the job initialization process of link 300 merges two of the groups of target items. In this way, the job initialization process of link 300 identifies four groups of target items, three of which specify one target item each and one of which specifies two target items.

Figure 20B:
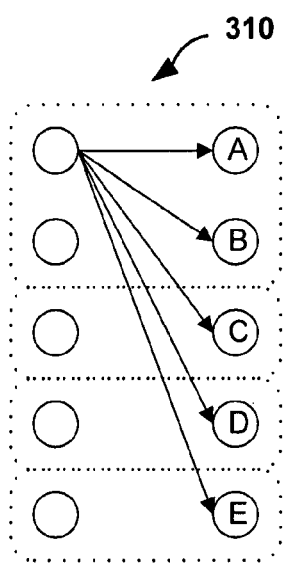

FIG. 20B illustrates an example link 310 that maps one source item to five different target items. When a job initialization process of link 310 identifies overlapping groups of source items, the job initialization process of link 310 may initially identify one group of target items that includes all five target items. Furthermore, the job initialization process of link 310 may determine that there are fewer groups of target items than there are available processors in application servers 26. Because there are fewer groups of target items than there are available processors in application servers 26, the job initialization process of link 310 does not attempt to further consolidate the groups of target items. However, the job initialization process of link 310 may determine that the number of target items in the group of target items is greater than the maximum permitted number of target items in a group. For this reason, the job initialization process of link 310 may divide the target items in the group into a first group that specifies three target items and a second group that specifies two target items. Next, the job initialization process of link 310 may determine that there are fewer groups of target items than there are processors. For this reason, the job initialization process of link 310 may divide the first group and the second group such that there are now four groups of target items: three of which specify one target item and one of which specifies two target items.

Figure 20C:
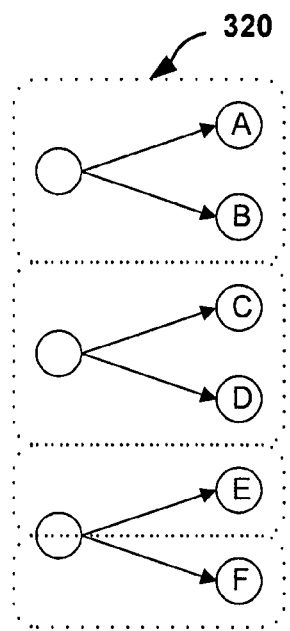

FIG. 20C illustrates an example link 320 that maps each source item to two target items. When a job initialization process of link 320 identifies overlapping groups of source items, the job initialization process of link 320 may place target item A and target item B in a first group, target item C and target item D in a second group, and target node E and target node F in a third group. Because there are fewer groups than there are available processors in application servers 26, the job initialization process of link 320 does not further consolidate the groups. Furthermore, because none of the groups include more than maximum permitted number of target items, the job initialization process of link 320 does not divide any of the groups. However, the job initialization process of link 320 may determine that there are fewer groups than there are available processors. For this reason, the job initialization process of link 320 may split one of the groups into two groups. Hence, the job initialization process of link 320 may identify four groups of target items for link 320: two of which specify two target items and two of which specify one target item each.

Figure 20D:
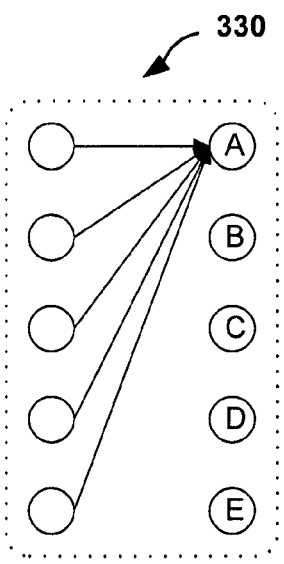

FIG. 20D illustrates an example link 330 that maps five source items to one target item. When a job initialization process of link 330 identifies overlapping groups of source items, the job initialization process of link 330 may place target item A in a first group. Because there is only one group, the job initialization process of link 330 cannot further consolidate the groups. Furthermore, because the first group only contains a single target item, the job initialization process of link 330 may not divide the first group. However, when job allocation module 206 assigns a work element based on the first group to a job module, the job module may divide the source items into one or more batches, depending on the maximum permitted number of source items in a batch.

Figure 20E:
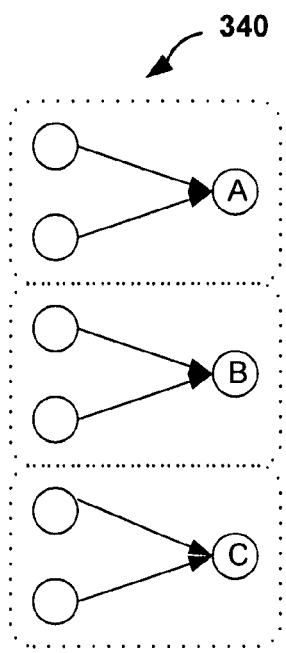

FIG. 20E illustrates an example link 340 that maps two source items to each target item. When a job initialization process of link 340 identifies overlapping groups of source items, the job initialization process of link 340 may place target item A in a first group, target item B in a second group, and target item C in a third group. This is because link 340 does not map the any source item to more than one target item. Furthermore, because there are fewer groups of target items than there are available processors, the job initialization process of link 340 does not further consolidate the groups. In addition, the job initialization process of link 340 does not divide the groups because none of the groups includes more than one target item.

Figure 20F:
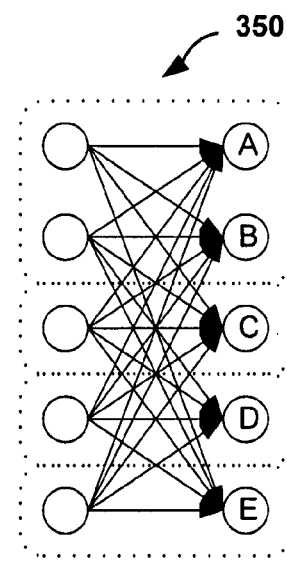

FIG. 20F illustrates an example link 350 that maps each source item to each target item. When a job initialization process of link 350 identifies overlapping groups of source items, the job initialization process of link 350 may place target items A, B, C, D, and E in a first group because each of these target items share a common set of source items. Furthermore, because there is only a single group of target items, the job initialization process of link 350 may not further consolidate groups of target items. However, the job initialization process of link 350 may divide the first group into two groups of target items because the number of target items in the first group exceeds the maximum permitted number of target items in a group. Furthermore, the job initialization process of link 350 may determine that the number of groups of target items is less than the number of available processors. For this reason, the job initialization process of link 350 may divide the groups such that there are four groups of target items. As illustrated in the example of FIG. 20F, the job initialization process of link 350 may place target items A and B in a first group, target item C in a second group, target item D in a third group, and target item E in a fourth group.

Various embodiments of the invention have been described. Although described in reference to an enterprise planning system, such as an enterprise financial or budget planning system, the techniques may be readily applied to other software systems, including other large-scale enterprise software systems. Examples of other enterprise software systems include order management systems, inventory management systems, sales force management systems, business intelligence tools, enterprise reporting tools, project and resource management systems and other enterprise software systems. Moreover, the techniques may be implemented on any type of computing device, including servers, client computers, laptops or other devices. These and other embodiments are within the scope of the following claims.

The invention claimed is:

1. A method for exporting data from a software system comprising:
   defining a link from a source model of a first software application to a target model of a second software application, wherein the link specifies a source area of a multidimensional database comprising one or more multidimensional data cubes defined by the source model, the source area being associated with the first software application, and a target area of a multidimensional database comprising one or more multidimensional data cubes defined by the target model, the target area being associated with the second software application, and wherein the link defines a mapping between source items in the one or more multidimensional data cubes of the source model and target items in the one or more multidimensional data cubes of the target model;
   automatically formulating, by one or more computing devices, a plurality of work elements that, when executed, move multidimensional data from the source area to the target area in accordance with the link, wherein automatically formulating the plurality of work elements comprises:
      identifying groups of the target items that the mapping maps to groups of the source items;
      determining overlaps of items between the groups of the source items specified by the mapping, wherein the overlaps correspond to source items that are common to two or more of the groups of the source items; and
      formulating the plurality of work elements such that each of the work elements specifics one of the groups of the target items and a corresponding one of the groups of the source items based on the mapping, and such that each of the items in at least one of the overlaps of items is present in only one of the work elements; and
   executing the work elements.

2. The method of claim 1, wherein identifying the groups of the target items further comprises:
   estimating a number of available processors that are configured to execute the work elements; and
   combining two or more of the identified groups of target items into a single group when the identified groups of target items outnumber the available processors.

3. The method of claim 1, wherein identifying the groups of the target items comprises dividing one of the identified groups of target items into two or more groups when the one of the identified groups of target items includes more target items than a maximum number of target items allowed in a group.

4. The method of claim 1, wherein identifying the groups of target items comprises dividing one of the identified groups of target items into two or more groups of target items when there are fewer of the identified groups than there are processors configured to execute the work elements.

5. The method of claim 1, wherein executing the work elements comprises:
   loading that portion of the multidimensional data that is associated with the source items specified in one of the work elements from the multidimensional data cubes;
   generating a data block based on the data associated with the source items; and
   integrating the data block into the target model.

6. The method of claim 5,
   wherein the method further comprises defining at least one data transformation; and
   wherein generating the data block comprises applying the transformation to the data associated with the source items in order to generate the data block.

7. The method of claim 1, wherein executing the work elements comprises processing a first one of the work elements as a plurality of batches when the first one of the work elements specifies more source items than a maximum permitted number of source items.

8. The method of claim 7, wherein the maximum permitted number of source items is set by an administrator.

9. The method of claim 7, wherein processing the first one of the work elements as a plurality of batches comprises:

loading multidimensional data associated with source items in a first one of the batches;

invoking a link engine that generates a data block based on the loaded multidimensional data associated with the source items in the first one of the batches; and loading multidimensional data associated with source items in a second one of the batches after invoking the link engine.

10. The method of claim 1, wherein defining the mapping comprises defining the mapping to map a plurality of the source items to one of the target items.

11. The method of claim 1, wherein defining the mapping comprises defining the mapping to map a plurality of the source items to a plurality of the target items.

12. The method of claim 1, further comprising:

downloading multidimensional planning data to a client device of a user;

automatically moving the multidimensional data from the source area to the planning data upon manual invocation of the link by the user; and saving the planning data to the target area from the client device.

13. The method of claim 1, wherein automatically moving multidimensional data comprises exporting a consistent set of data from the source area.

14. A system comprising:

a first database storing multidimensional data for a first software application;

a second database storing multidimensional data for a second software application;

an interface that receives input that defines a link specifying a source area of the first database and a target area of the second database, wherein the link defines a mapping between source items in one or more multidimensional data cubes of a source model for the first database and target items in one or more multidimensional data cubes of a target model for the second database;

a link control module that automatically formulates a plurality of work elements that, when executed, move multidimensional data from the source area to the target area in accordance with the link, wherein to formulate the plurality of work elements, the link control module identifies groups of the target items that the mapping maps to groups of the source items, determines overlaps of items between the groups of the source items specified by the mapping, wherein the overlaps correspond to source items that are common to two or more of the groups of the source items, and formulates the plurality of work elements such that each of the work elements specifies one of the groups of the target items and a corresponding one of the groups of the source items based on the mapping, and such that each of the items in at least one of the overlaps of items is present in only one of the work elements; and a set of one or more processors that execute the plurality of work elements.

15. The system of claim 14, wherein the interface includes input areas by which an administrator specifies the source model in the first database and the target model in the second database, and wherein the interface includes input areas by which the administrator specifies the mapping between the source items in the one or more multidimensional data cubes of the source model and the target items in the one or more multidimensional data cubes of the target model.

16. The system of claim 14, wherein the interface includes input areas by which an administrator defines the mapping.

17. The system of claim 14, wherein the job initialization process identifies the groups of the target items in part by dividing one or more of the identified groups into two or more groups of the target items when the one of the identified groups includes more of the target items than a maximum number of items in the target dimension permitted in a group of the target items.

18. The system of claim 14, wherein the job initialization process identifies the groups of the target items in part by dividing one of the identified groups into two or more groups when there are fewer of the identified groups than there are processors in the system configured to execute the work elements.

19. The system of claim 14, wherein the job initialization process identifies the groups of the target items in part by combining two or more of the identified groups where there are more of the identified groups than there are processors in the system configured to execute the work elements.

20. The system of claim 14, wherein when the set of one or more processors executes one of the work elements, the set of one or more processors executes a job module that loads that portion of the multidimensional data that is associated with each of the source items that are specified in the one of the work elements, wherein the set of one or more processors executes a link engine that outputs a data block based on the multidimensional data that is associated with the source items specified in the one of the work elements, wherein the system further comprises an import queue to integrate the data block into the target model.

21. The system of claim 20, wherein the interlace includes input areas by which an administrator defines at least one data transformation for an item in the target dimension, and wherein when the link engine generates the data block, the link engine applies the transformation to the multidimensional data in order to output the data block.

22. The system of claim 20, wherein the job module processes a first one of the work elements as a plurality of batches when the first one of the work elements specifics more source items than a maximum permitted number of source items.

23. The system of claim 22, wherein the interface includes an input field by which an administrator enters the maximum permitted number of source items.

24. The system of claim 22, wherein the job module loads from the first database multidimensional data associated with source items in a first one of the batches and invokes a link engine that generates a data block based on the loaded multidimensional data associated with the first one of the batches;

wherein, after invoking the link engine, the job module loads from the first database multidimensional data associated with the source items in a second one of the batches.

25. The system of claim 14, wherein the interface includes input areas by which an administrator defines the mapping to map a plurality of the source items to one of the target items.

26. The system of claim 14, wherein the interface includes input areas by which an administrator defines the mapping to map a plurality of the source items to a plurality of the target items.

27. The system of claim 14, further comprising:

a client device providing an operating environment for a planning software application, wherein the planning software application downloads user-specific planning data from the second database to the client device, automatically retrieves the multidimensional data from the source area of the first database upon manual invocation of the link by a user, and saves the user-specific planning data and the multidimensional data to the target area from the client device.

28. A computer-readable storage medium comprising instructions that, when executed, cause a processor to:

present a user interface to receive input that specifies a mapping from one or more source items in one or more multidimensional data cubes of a source model to one or more target items in one or more multidimensional data cubes of a target model;

automatically formulate a plurality of work elements that, when executed, move multidimensional data in the source model that are associated with the source items of the source data cube to the target items of the target model wherein the instructions that cause the processor to automatically formulate the plurality of work elements comprise instructions that cause the processor to:

identify groups of the target items that the mapping maps to groups of the source items;

determine overlaps of items between the groups of the source items specified by the mapping, wherein the overlaps correspond to source items that are common to two or more of the groups of the source items; and formulate the plurality of work elements such that each of the work elements specifies one of the groups of the target items and a corresponding one of the groups of the source items based on the mapping, and such that each of the items in at least one of the overlaps of items is present in only one of the work elements; and cause one or more other processors to execute the plurality of work elements.

29. The computer-readable storage medium of claim 28, wherein the instructions that cause the processor to present the interface cause the processor to:

present input fields by which a user identities a source data cube in the source model and a target data cube in the target model;

present input fields by which the user identities a source dimension of the source data cube and a target dimension of the target data cube; and present input fields by which the user defines the mapping between the source items of the source dimension and the target items of the target dimension.

* * * * *